(12) United States Patent
Choi et al.

(10) Patent No.: US 9,077,940 B2
(45) Date of Patent: Jul. 7, 2015

(54) DISPLAY APPARATUS

(75) Inventors: Hoon Choi, Hwaseong-si (KR); Hyeon-Joo Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 305 days.

(21) Appl. No.: 12/949,122

(22) Filed: Nov. 18, 2010

(65) Prior Publication Data

US 2011/0116218 A1 May 19, 2011

(30) Foreign Application Priority Data

| Nov. 18, 2009 | (KR) | 10-2009-0111360 |
| Feb. 26, 2010 | (KR) | 10-2010-0017739 |
| Apr. 16, 2010 | (KR) | 10-2010-0035556 |
| Apr. 30, 2010 | (KR) | 10-2010-0041093 |

(51) Int. Cl.

| *H04N 5/00* | (2011.01) |
| *G06Q 99/00* | (2006.01) |
| *H04N 5/64* | (2006.01) |
| *G06F 1/16* | (2006.01) |
| *G06Q 50/18* | (2012.01) |
| *F16M 11/10* | (2006.01) |

(52) U.S. Cl.
CPC ............... *H04N 5/64* (2013.01); *G06F 1/1601* (2013.01); *G06Q 50/188* (2013.01); *G06Q 99/00* (2013.01); *F16M 11/10* (2013.01)

(58) Field of Classification Search
None
See application file for complete search history.

(56) References Cited

U.S. PATENT DOCUMENTS

| 5,329,289 | A | | 7/1994 | Sakamoto et al. |
| 5,977,935 | A | * | 11/1999 | Yasukawa et al. ................ 345/8 |
| 6,032,918 | A | | 3/2000 | Cho |
| 6,168,124 | B1 | | 1/2001 | Matsuoka et al. |
| 6,268,998 | B1 | | 7/2001 | Cho |
| 6,320,559 | B1 | * | 11/2001 | Yasukawa et al. ................ 345/7 |
| 6,560,124 | B1 | | 5/2003 | Irie et al. |
| 7,113,151 | B2 | * | 9/2006 | Kinebuchi ........................ 345/8 |
| 7,373,431 | B2 | * | 5/2008 | Kondo ............................. 710/2 |
| 7,377,603 | B2 | * | 5/2008 | Quijano ........................ 312/245 |
| 7,411,796 | B2 | * | 8/2008 | Lee et al. ....................... 361/807 |
| 7,447,034 | B2 | * | 11/2008 | Shin .............................. 361/714 |

(Continued)

FOREIGN PATENT DOCUMENTS

| CN | 1420502 A | 5/2003 |
| EP | 1 790 901 A2 | 5/2007 |

(Continued)

OTHER PUBLICATIONS

Communication, dated Jun. 14, 2012, issued by the European Patent Office in counterpart European Application No. 10191339.0.

(Continued)

*Primary Examiner* — Jay Patel
*Assistant Examiner* — Reza Aghevli
(74) *Attorney, Agent, or Firm* — Sughrue Mion, PLLC

(57) ABSTRACT

A display apparatus includes: a display unit which includes a display connector and displays an image; and a main body which includes a power supply unit for supplying power to the display unit, an image processing unit for outputting image signals, and a main body connector which is directly or indirectly connected to the display connector in order to supply the power and the image signals output from the power supply unit and the image processing unit, respectively, to the display unit.

22 Claims, 39 Drawing Sheets

(56) References Cited

U.S. PATENT DOCUMENTS

| | | | |
|---|---|---|---|
| 7,598,674 | B2 | 10/2009 | Jeong |
| 7,663,576 | B2 * | 2/2010 | Ozaki ............................ 345/76 |
| 7,719,832 | B2 * | 5/2010 | Kobara et al. ............ 361/679.58 |
| 7,766,296 | B2 | 8/2010 | Choi et al. |
| 7,819,368 | B2 | 10/2010 | Jung et al. |
| 7,825,877 | B2 * | 11/2010 | Yoshida ....................... 345/75.2 |
| 7,855,703 | B1 | 12/2010 | Kang et al. |
| 8,166,514 | B2 | 4/2012 | Doumuki |
| 2002/0126110 | A1 * | 9/2002 | Bowron ....................... 345/204 |
| 2004/0257319 | A1 * | 12/2004 | Park et al. ....................... 345/87 |
| 2004/0263423 | A1 | 12/2004 | Huang et al. |
| 2004/0263495 | A1 * | 12/2004 | Sugino et al. ................. 345/204 |
| 2006/0082265 | A1 * | 4/2006 | Quijano ..................... 312/223.2 |
| 2006/0184974 | A1 | 8/2006 | Sakao et al. |
| 2006/0203143 | A1 * | 9/2006 | Shin ................................ 349/58 |
| 2006/0290687 | A1 * | 12/2006 | Takaji et al. .................. 345/204 |
| 2007/0096606 | A1 * | 5/2007 | Ryu .............................. 312/7.2 |
| 2007/0252827 | A1 * | 11/2007 | Hirota ........................... 345/204 |
| 2007/0252919 | A1 | 11/2007 | McGreevy |
| 2008/0030112 | A1 | 2/2008 | Lee et al. |
| 2008/0068359 | A1 * | 3/2008 | Yoshida et al. ............... 345/204 |
| 2008/0099646 | A1 * | 5/2008 | Kobara et al. ............... 248/309.1 |
| 2008/0158111 | A1 * | 7/2008 | Sakata et al. ................... 345/76 |
| 2009/0051674 | A1 * | 2/2009 | Kimura et al. ................ 345/204 |
| 2009/0051974 | A1 * | 2/2009 | Ishizuka et al. .............. 358/3.27 |
| 2009/0079665 | A1 | 3/2009 | Moscovitch |
| 2009/0128452 | A1 * | 5/2009 | Bril et al. ......................... 345/55 |
| 2010/0053140 | A1 * | 3/2010 | Kubota et al. ................. 345/211 |
| 2010/0067181 | A1 | 3/2010 | Bair et al. |
| 2011/0069055 | A1 | 3/2011 | Jung et al. |
| 2011/0242439 | A1 | 10/2011 | Calderon et al. |

FOREIGN PATENT DOCUMENTS

| | | | | |
|---|---|---|---|---|
| EP | | 1939710 | * 12/2007 | ............... G06F 1/16 |
| EP | | 1939710 A2 | 7/2008 | |
| JP | | 7-225633 A | 8/1995 | |
| JP | | 8264980 A | 10/1996 | |
| JP | | 2001-083902 A | 3/2001 | |
| JP | | 2002-229676 A | 8/2002 | |
| JP | | 2003-150068 A | 5/2003 | |
| JP | | 2003-219317 A | 7/2003 | |
| JP | | 2004-056802 A | 2/2004 | |
| JP | | 2006-146100 A1 | 6/2006 | |
| JP | | 2006-154842 A | 6/2006 | |
| KR | | 10-2000-0074394 A | 12/2000 | |
| KR | | 10-2005-0003219 A | 1/2005 | |
| KR | | 10-2005-0105065 A | 11/2005 | |
| KR | | 10-2006-0027273 A | 3/2006 | |
| KR | | 100782177 B1 | 11/2007 | |
| KR | | 1020080056824 A | 6/2008 | |
| KR | | 1020080063681 A | 7/2008 | |
| KR | | 1020100012012 A | 2/2010 | |
| WO | | 03/056663 A1 | 7/2003 | |

OTHER PUBLICATIONS

Communication dated Mar. 10, 2100, issued by the European Patent Office in counterpart European Application No. 10191339.0.

Communication dated Oct. 26, 2012 issued by the United States Patent Office in counterpart U.S. Appl. No. 13/541,230.

Communication dated Sep. 21, 2012 issued by the Korean Intellectual Property Office in counterpart Korean Patent Application No. 10-2010-0041093.

Communication dated Oct. 1, 2013, issued by the European Patent Office in counterpart European Application No. 13180892.5.

Partial European Search Report dated May 28, 2013 issued in corresponding European Application No. 12191444.1.

US Office Action dated Mar. 28, 2013 issued in corresponding U.S. Appl. No. 13/541,230.

US Office Action dated Jun. 27, 2013 issued in corresponding U.S. Appl. No. 13/541,230.

Communication dated Jan. 28, 2014 issued by the European Patent Office in counterpart European Patent Application No. 10191339.0.

Communication dated May 4, 2014, issued by the State Intellectual Property Office of the People's Republic of China in counterpart Chinese Application No. 201080042073.7.

Communication dated Jun. 30, 2014, issued by the European Patent Office in counterpart European Application No. 10191339.0.

Communication dated Jul. 31, 2014, issued by the United States Patent and Trademark Office in counterpart U.S. Appl. No. 13/541,230.

Communication dated Aug. 19, 2014 issued by Japanese Patent Office in counterpart Japanese Patent Application No. 2012-530777.

Communication dated Feb. 27, 2015 issued by European Patent Office in counterpart European Application No. 13180892.5.

* cited by examiner

DISPLAY APPARATUS

CROSS-REFERENCE TO RELATED APPLICATIONS

This application claims priorities from Korean Patent Application Nos. 10-2009-0111360, filed on Nov. 18, 2009, 10-2010-0017739, filed on Feb. 26, 2010, 10-2010-0035556, filed on Apr. 16, 2010 and 10-2010-0041093, filed on Apr. 30, 2010 in the Korean Intellectual Property Office, the disclosures of which are incorporated herein by reference.

BACKGROUND

1. Field

Apparatuses consistent with the exemplary embodiments relate to a display apparatus, and more particularly, to a display apparatus with improvement of structure of its display unit and main body.

2. Description of the Related Art

A display apparatus is an apparatus which processes and displays an input image signal.

In general, a display apparatus includes a display unit which displays an image signal, a driving circuit which receives and processes the image signal in such a manner that it can be displayed on the display unit, and so on. The display unit includes a display panel which displays the image signal, and so on. The driving circuit includes an image processing unit which receives and processes the image signal in such a manner that it can be displayed on the display panel, a power supply unit which supplies power to the display unit and the image processing unit, and so on.

An example of such a display apparatus may include a television (TV) which receives and displays broadcasting signals provided by broadcasting stations or external image signals such as digital versatile disk (DVD) signals and so on.

However, such a conventional display apparatus is made relatively heavy and thick as it includes the display panel for displaying an image, which is mounted in the display unit, as well as the driving circuit for processing the image signal, which is mounted in the rear side of the display panel.

There is therefore a need for a display apparatus to form a lighter and thinner display unit to make the appearance of the apparatus slimmer for improvement of user's convenience.

SUMMARY

Accordingly, one or more exemplary embodiments provide a display apparatus which is capable of making a display unit slim to the utmost limit for improvement of user's convenience.

The foregoing and/or other aspects may be achieved by providing a display apparatus including: a display unit which includes a display connector and displays an image; and a main body which includes a power supply unit for supplying power to the display unit, an image processing unit for outputting image signals, and a main body connector which is directly or indirectly connected to the display connector in order to supply the power and the image signals output from the power supply unit and the image processing unit, respectively, to the display unit.

At least one of the display connector and the main body connector may include: image signal pins for the image signals; and first and second power pins which are respectively disposed in both sides with the image signal pins interposed between the first and second power pins in order to supply the power to the display unit.

The display unit may include a backlight unit including a first light source arranged at one side of the display unit and a second light source arranged at the other side of the display unit in order to provide light to the display panel, and the power may be supplied to the first and second light sources via the first and second power pins, respectively.

Each of the display connector and the main body connector may be a single connector.

The display unit may further include a display panel which displays an image, and a panel driving board which has a timing controller for controlling a time difference which occurs when the image signals input from the image processing unit are displayed on the display panel, and the display connector may be mounted on the panel driving board.

The display apparatus may further include a rear cover which covers the panel driving board.

The display unit may further include a front chassis and a rear chassis which are arranged in the front and rear sides of the display unit, respectively, with the display panel interposed between the front chassis and the rear chassis, and the panel driving board and the rear cover may be fastened to the back side of the rear chassis.

The rear cover may cover the entire back side of the rear chassis.

The display unit may further include: a display panel which is interposed between a front chassis and a rear chassis of the display unit and displays an image; a panel driving board which is mounted on the back side of the rear chassis and is mounted thereon with a timing controller for controlling a time difference which occurs when the image signals input from the image processing unit are displayed on the display panel, and the display connector; and a connector board which is mounted on the back side of the rear chassis in such a manner that the connector board is separated from the panel driving board, and supports the display connector.

The display apparatus may further include a rear cover which is coupled to the back side of the rear chassis and covers the panel driving board and the connector board.

The main body may include a speaker which is disposed in the front side and lateral sides of the main body.

The display apparatus may further include: a stand unit which has a lower side coupled to the main body and is erected, and an upper side coupled to the display unit; and a connection cable which is accommodated in the stand unit and interconnects the display connector and the main body connector.

The display apparatus may further include a swivel unit which allows the stand unit to be rotated with respect to the main body around a longitudinal axial line of the stand unit.

The swivel unit may include a swivel member which is coupled to the stand unit and is rotated along with the stand unit, a guide member which is provided in the main body and guides rotation of the swivel member, a swivel bracket which is coupled to the swivel member, with the guide member interposed between the swivel bracket and the swivel member, and is rotated along with the swivel member, and a sliding member which is interposed between the guide member and the swivel bracket.

The main body connector may be directly connected to the display connector.

The main body may be directly coupled to the back side of the display unit.

The bottom of the main body may be arranged to equal to or lower than the bottom of the display unit.

The display unit may further include: a display panel which is interposed between a front chassis and a rear chassis of the display unit and displays an image; a panel driving board which is mounted on the back side of the rear chassis and is mounted thereon with a timing controller for controlling a time difference which occurs when the image signals input from the image processing unit are displayed on the display panel, and the display connector; a rear cover which covers the panel driving board; and a rear cover accommodating unit which is formed in the main body and accommodates the rear cover.

The display unit may further include a user input unit, and a control signal input through the user input unit may be delivered to the main body via the display connector and the main body connector.

The main body may include a main body casing, a power board which is accommodated in the main body casing and is formed thereon with the power supply unit, and a main board which is accommodated in the main body casing and is formed thereon with the image processing unit.

The main body may further include at least one of a tuner and an external signal input unit.

The main body may further include a user input unit formed at the top of the main body.

The main body connector may be directly connected to the display connector, the main body may be directly coupled to the back side of the display unit, and the bottom of the main body may be provided to be lower than the bottom of the display unit such that the user input unit is exposed forward.

The user input unit may be provided to be slidably moved forward and backward from the main body.

The main body connector may be directly connected to the display connector, the main body may be directly coupled to the back side of the display unit, and the user input unit may be provided to be slidably moved forward and backward from the main body.

The display apparatus may further include a stand unit comprising a lower side coupled to the main body and standing and an upper side coupled to the display unit, and electrically connecting ground of the main body with ground of the display unit.

Also, the display apparatus may further include a connection cable accommodated in the stand unit and connecting the display connector and the main body connector.

The display apparatus may further include at least one wall-mount support member coupled to the rear chassis and supporting the display apparatus to be mounted to a wall.

The rear chassis may include a fastening member to fasten the wall-mount support member.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
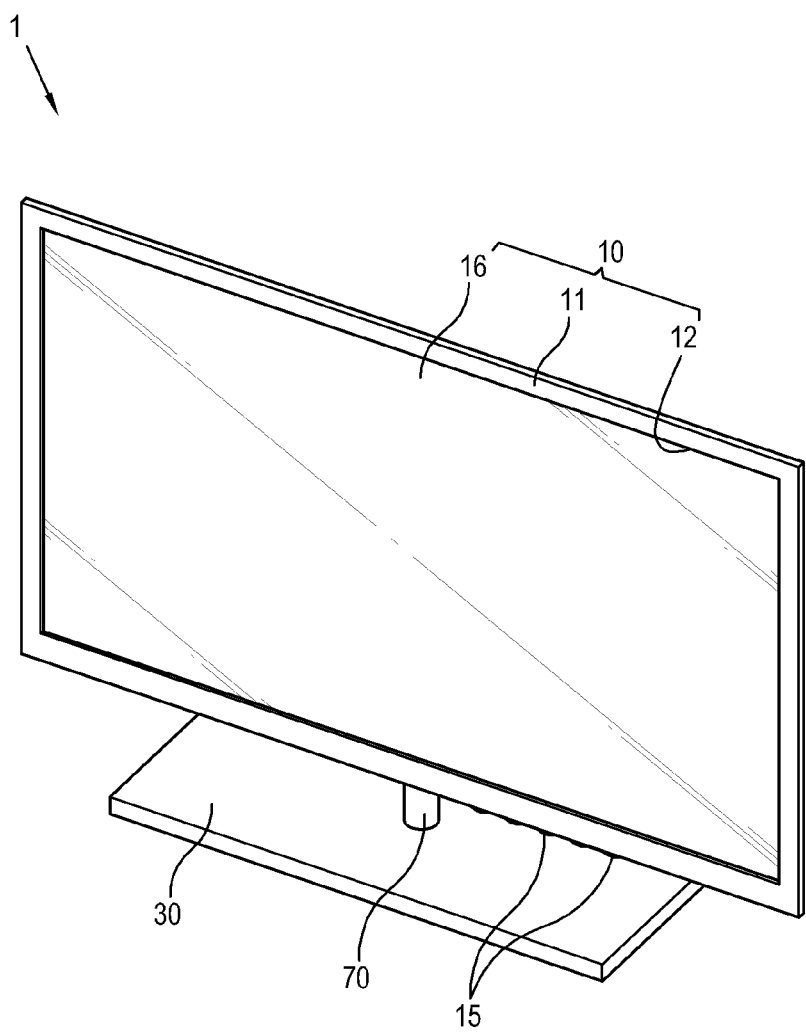
FIG. 1 is a perspective view of a display apparatus according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Expressions such as "at least one of" preceding a list of elements, modify the entire list and do not modify the individual elements of the list.

In the following exemplary embodiments, explanation of components having no direct relation to the spirit of the present invention is omitted for the purpose of clarity, and like reference numerals refer to like elements throughout.

As shown in FIGS. 1 to 9, a display apparatus 1 according to a first exemplary embodiment of includes a display unit 10 which displays an image, a main body 30 including a power supply unit 37 which supplies power and an image processing unit 45 which outputs an image signal, and a connection unit through which the power and image signals from the power supply unit 37 and the image processing unit 45 are supplied to the display unit 10. The connection unit includes a main body connector 63 exposed to the outside of the main body 30 and a display connector 61 (FIG. 18) exposed to the outside of the display unit 10 in a manner to be connectable to the main body connector 63.

Figure 2:
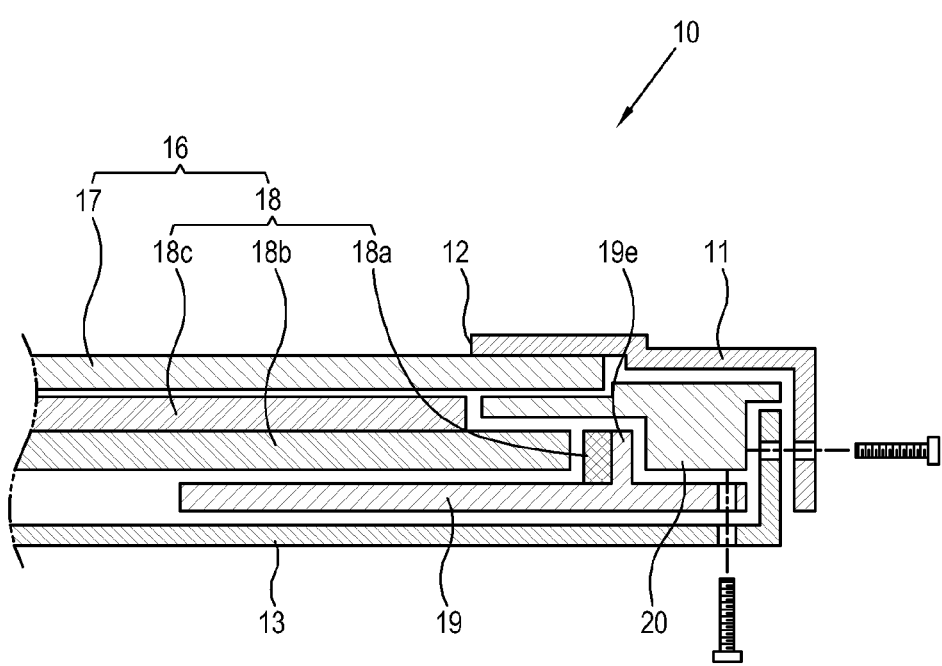
FIG. 2 is a cross sectional view of the display apparatus in FIG. 1.

As shown in FIGS. 1 and 2, the display unit 10 includes a display module 16 which displays an image, and front and rear chassis 11 and 13 which are respectively arranged in the front and rear of the display module 16. The display module 16 includes a display panel 17 which displays the image and a backlight unit 18 which provides light to the display panel 17. An opening 12 to expose the image formed on the display panel 17 is formed in the front chassis 11. An example of the display panel 17 may include, but is not limited to, a liquid crystal display (LCD) panel, a plasma display panel (PDP) or an organic light emitting diode (OLED). The backlight unit 18 includes a light source 18a which emits light, a light guide plate 18b which makes the light emitted from the light source 18a uniform, and an optical sheet 18c which is disposed in the front of the light guide plate 18b and includes a diffusing film which diffuses the light supplied from the light guide plate 18b, a prism film and the like.

In this example, the light source 18a is provided as an edge type in which light emitting diodes (LEDs) are disposed adjacent to four sides of the light guide plate 18b. However, without being limited thereto, the light source 18a may be provided as an edge type in which LEDs are disposed adjacent to two opposite sides of the light guide plate 18b or a direct type in which LEDs are disposed in the rear side of the light guide plate 18b. The light source 18a may be used in various forms including a cold cathode fluorescent lamp (CCFL) and an external electrode fluorescent lamp (EEFL).

In this exemplary embodiment, the display unit 10 may further include a light source support plate 19 which supports the light source 18a, as shown in FIG. 2.

The light source support plate 19 may be made of metallic material having good thermal conductivity, such as aluminum, an alloy thereof, copper, an alloy thereof, or the like. The light source support plate 19 may include a projecting support 19e which projects toward the light source 18a to directly or indirectly contact the light source 18a.

The light source 18a may be fastened to the light source support plate 19 through use of various means including a fastener, a bonding by a thermally conductive adhesive, hooking, fitting and the like.

The light source support plate 19 may be fastened to the rear chassis 13 by means of a fastener.

The display unit 10 may further include an intermediate member 20 which is interposed between the front chassis 11 and the rear chassis 13 to support the front chassis 11 and the rear chassis 13. The intermediate member 20 may be formed of a plastic mold. In some cases, the intermediate member 20 may be made of metallic material in consideration of thermal conductivity. The intermediate member 20 may be omitted as necessary.

The intermediate member 20 may be fastened to the front chassis 11 and the rear chassis 13 by means of fasteners. For example, as shown in FIG. 2, the intermediate member 20 may be fastened to the rear chassis 13 through the light source support plate 19 in the rear direction by means of one fastener and the front chassis 11 through the rear chassis 11 in the lateral direction by means of another fastener. Referring to FIG. 1, the display unit 10 may further include a user input unit 15. In this example, the user input unit 15 is formed in the front chassis 11 and includes several functional keys to allow a user to perform broadcasting channel change, screen control, volume control and the like. A control signal input through the user input unit 15 is transferred to a control unit 48 (see FIG. 7) of the main body 30 via a connection unit. The control unit 48 controls the image processing unit 45 and so on based on the transferred control signal. Thus, the user can perform the broadcasting channel change, the screen control, the volume control and so on through the user input unit 15. In this example, the user input unit 15 is formed to project downward from the bottom of the front chassis 11, but without being limited thereto, may be formed in the front or sides of the front chassis 11. It is to be understood that the user input unit 15 of the display apparatus according to the first exemplary embodiment may include a remote controller receiving unit which can receive a signal output from a separate remote controller.

As shown in FIGS. 4 to 7, as one example, the display unit 10 may further include a panel driving board 21 having a timing controller for controlling a time difference which may occur when an image signal input from the image processing unit 45 is displayed on the display panel 17.

Figure 4:
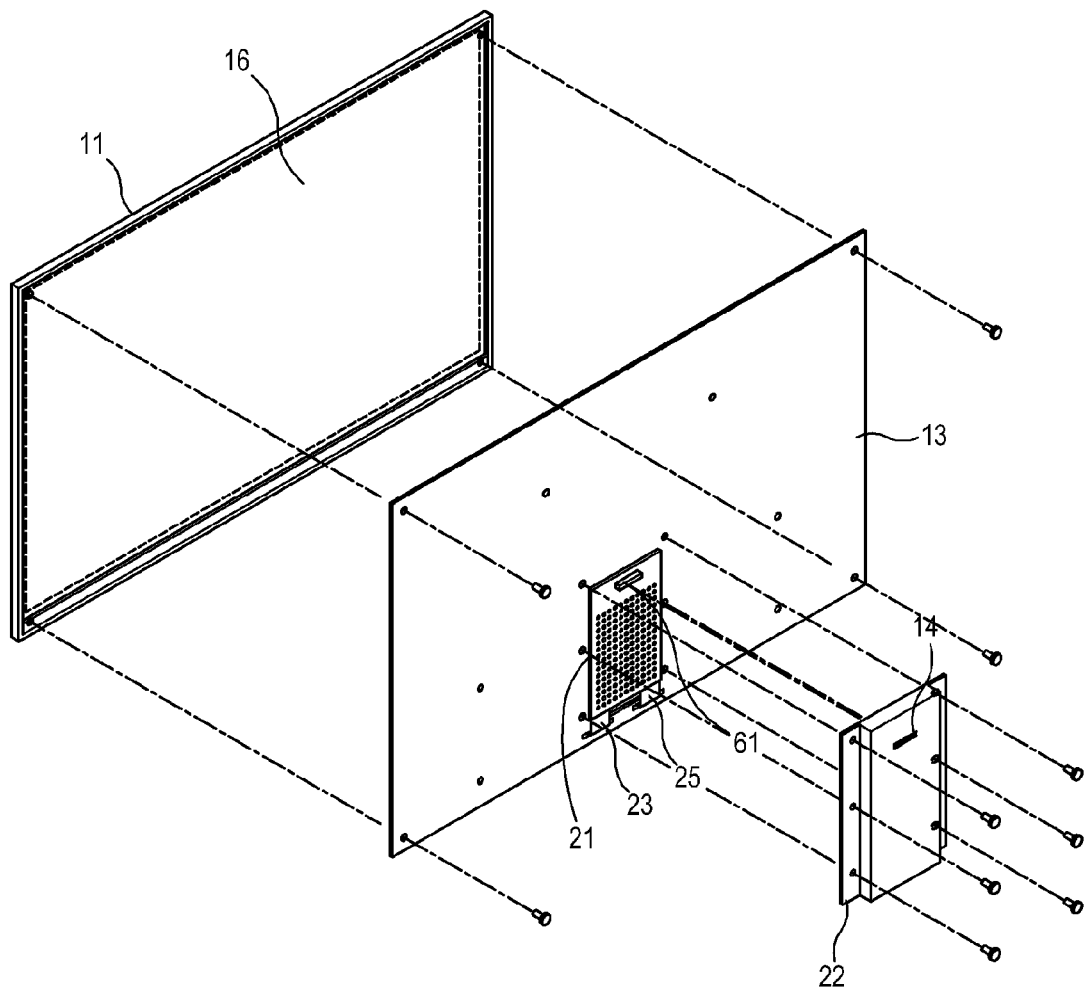
FIG. 4 is an exploded perspective view of a display unit in the display apparatus of FIG. 1.

In this example, a display connector 61 is mounted on the panel driving board 21. In addition, the panel driving board 21 is connected with an image cable 23 and a power cable 25 through which an image signal and power transferred through the display connector 61 are supplied to the display module 16. As shown in FIG. 4, in this example, the panel driving board 21 is mounted on the back side of the rear chassis 13. In addition, a rear cover 22 may be separately provided to cover the panel driving board 21 mounted on the back side of the rear chassis 13. In this example, a display connector opening 14 to expose the display connector 61 mounted on the panel driving board 21 is formed in the rear cover 22. Without being limited thereto, however, the panel driving board 21 may be interposed between the display panel 17 and the rear chassis 13. In this case, since the display connector opening 14 can be formed in the rear chassis 13, the separate rear cover 22 may be omitted.

Figure 18:
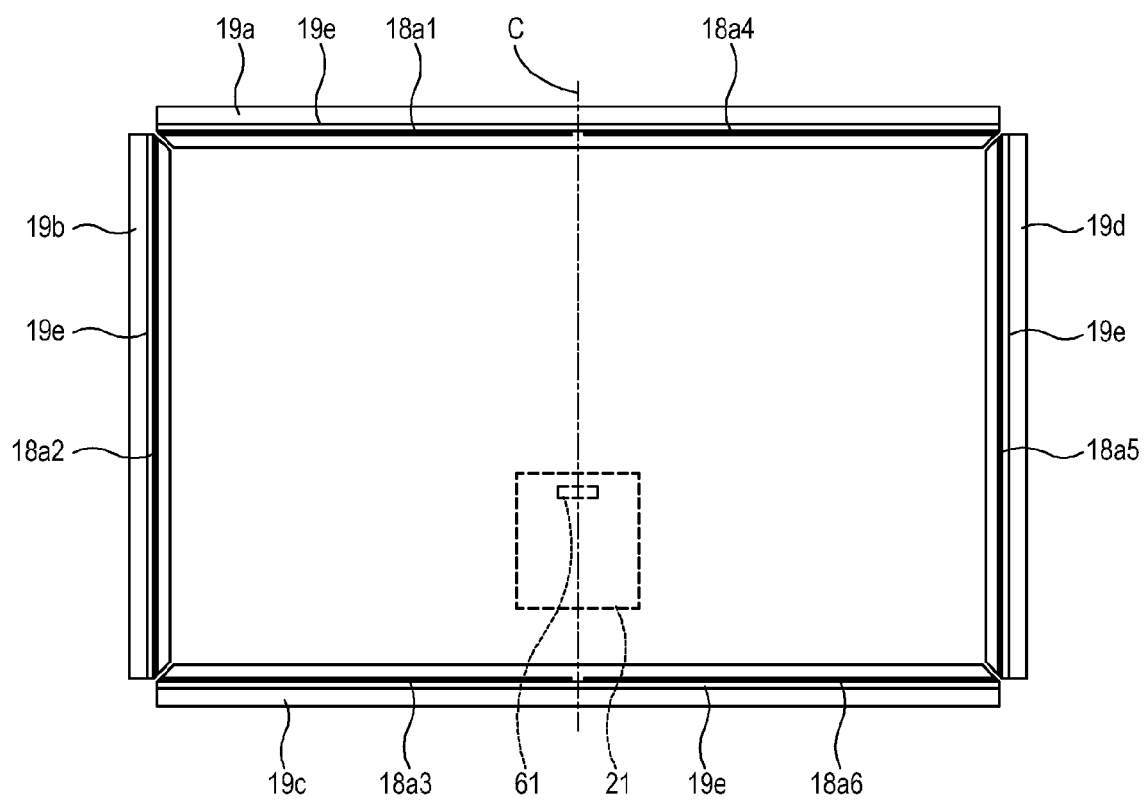
FIG. 18 is a main part front view of the display apparatus of FIG. 2.

FIG. 18 is a main part front view showing the light source support plate 19 and the light source 18a coupled to the light source support plate 19 in the display apparatus 1 shown in FIGS. 1 and 2 for the purpose of convenience of description.

The light source 18a may include a plurality of arrays of LEDs 18a1, 18a2, 18a3, 18a4, 18a5 and 18a6 arranged along the circumference of the display apparatus 1. In this exemplary embodiment, the arrays of LEDs 18a1, 18a2, 18a3, 18a4, 18a5 and 18a6 may be disposed in the four side edges of the light guide plate (18b in FIG. 2), as described above. As one example, the arrays of LEDs 18a1, 18a2, 18a3, 18a4, 18a5 and 18a6 may include the left arrays of LEDs 18a1, 18a2 and 18a3 arranged in the left edge with respect to a symmetrical line C in the width direction of the display apparatus 1 and the right arrays of LEDs 18a4, 18a5 and 18a6 arranged in the right edge with respect to the symmetrical line C.

Figure 20:
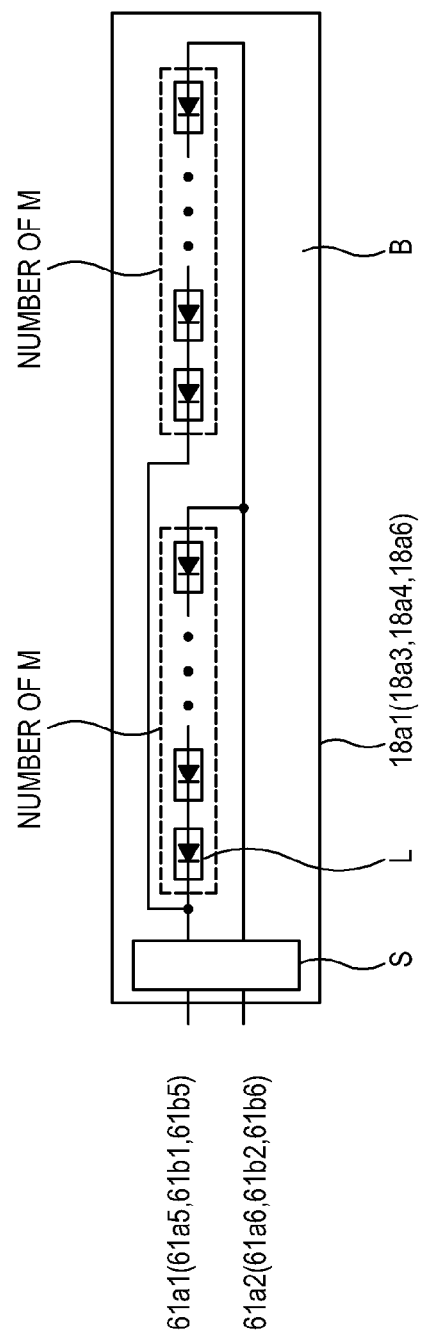
FIG. 20 is a view showing an example of light sources arranged at upper and lower edges in FIG. 18.

Among these arrays of LEDs, the upper and lower arrays of LEDs 18a1, 18a3, 18a4 and 18a6 arranged in the upper and lower edges may include more LEDs than the lateral arrays of LEDs 18a2 and 18a5 arranged in the left and right edges. For example, as shown in FIG. 20, each of the upper and lower arrays of LEDs 18a1, 18a3, 18a4 and 18a6 may include a substrate B; two sets of M LED elements L which are connected in series, with the two sets arranged in parallel on the substrate B; and a power input terminal S through which power is supplied to the LED elements L. In some cases, the LED elements L may be all connected either in series or in parallel. It is to be understood that electrical connection between the LED elements may vary depending on a user selection.

Figure 21:
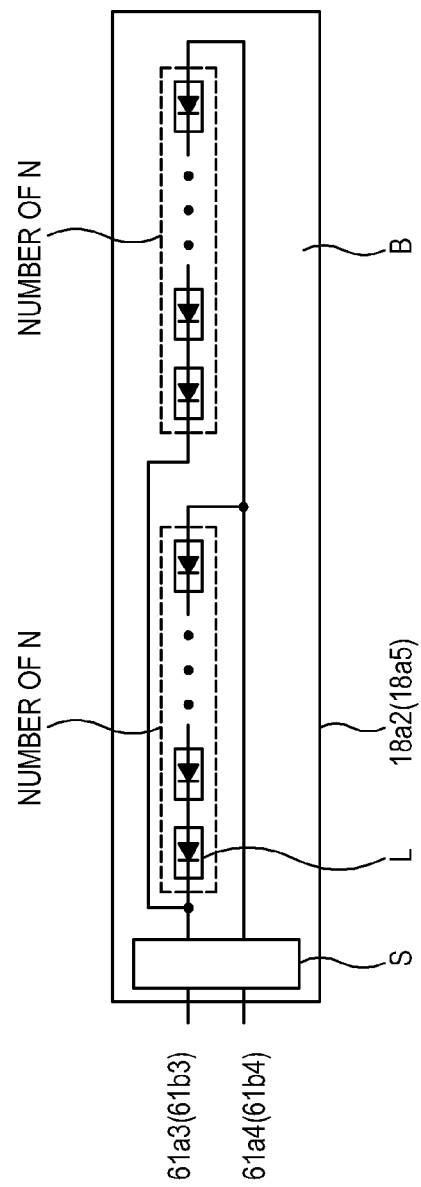
FIG. 21 is a view showing an example of light sources arranged at lateral edges in FIG. 18.
Figure 22:
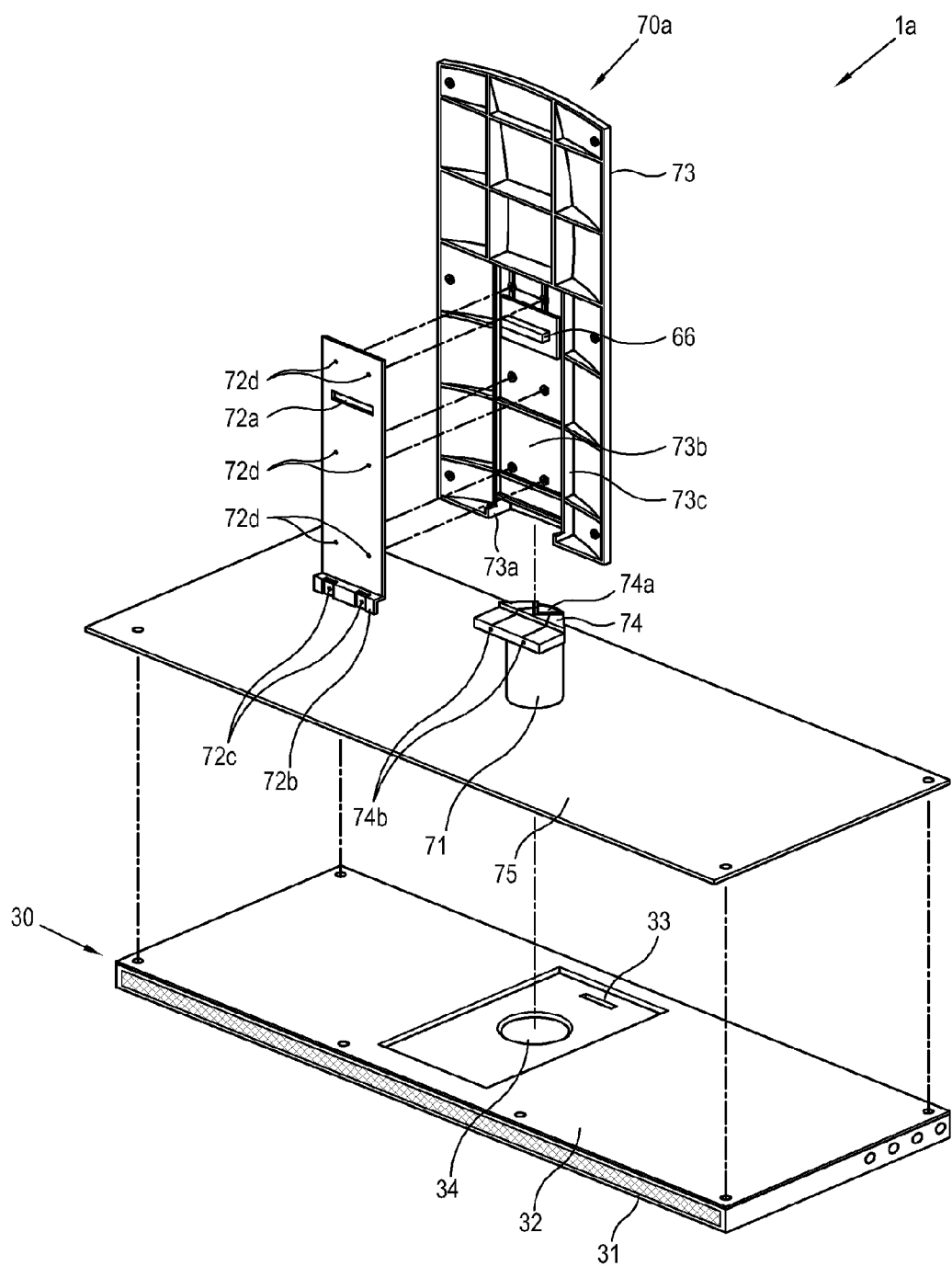
FIG. 22 is a partial perspective view of a display apparatus according to an eighth exemplary embodiment.

As another example, as shown in FIG. 21, each of the lateral arrays of LEDs 18a2 and 18a5 may include two sets of N LED elements L which are connected in series, with the two sets arranged in parallel. Where, M may be greater than N.

Although FIG. 18 shows the LED arrays arranged in the four edges, this is only by way of example. As another example, the LED arrays may be arranged only in the upper and lower edges in FIG. 18. That is, only the upper and lower LED arrays 18a1, 18a3, 18a4 and 18a6 are arranged and the lateral LED arrays 18a2 and 18a5 may be omitted. In other words, the LED arrays may be arranged in both or one of two pairs of opposite lateral sides.

If the LED arrays are arranged in only one pair of lateral sides, the light source support plate supporting the LED arrays may be correspondingly arranged in only the one pair of lateral sides.

The light source support plate 19 may include an upper light source support plate 19a which supports the upper LED arrays 18a1 and 18a4; left and right light source support plates 19b and 19d which support the left and right lateral LED arrays 18a2 and 18a5, respectively; and a lower light source support plate 19c which supports the lower LED arrays 18a3 and 18a6. Although it is illustrated in FIG. 18 that each of the light source support plates 19a, 19b, 19c and 19d is in a single form along the circumference, it may be formed of multiple pieces, if necessary.

Figure 8:
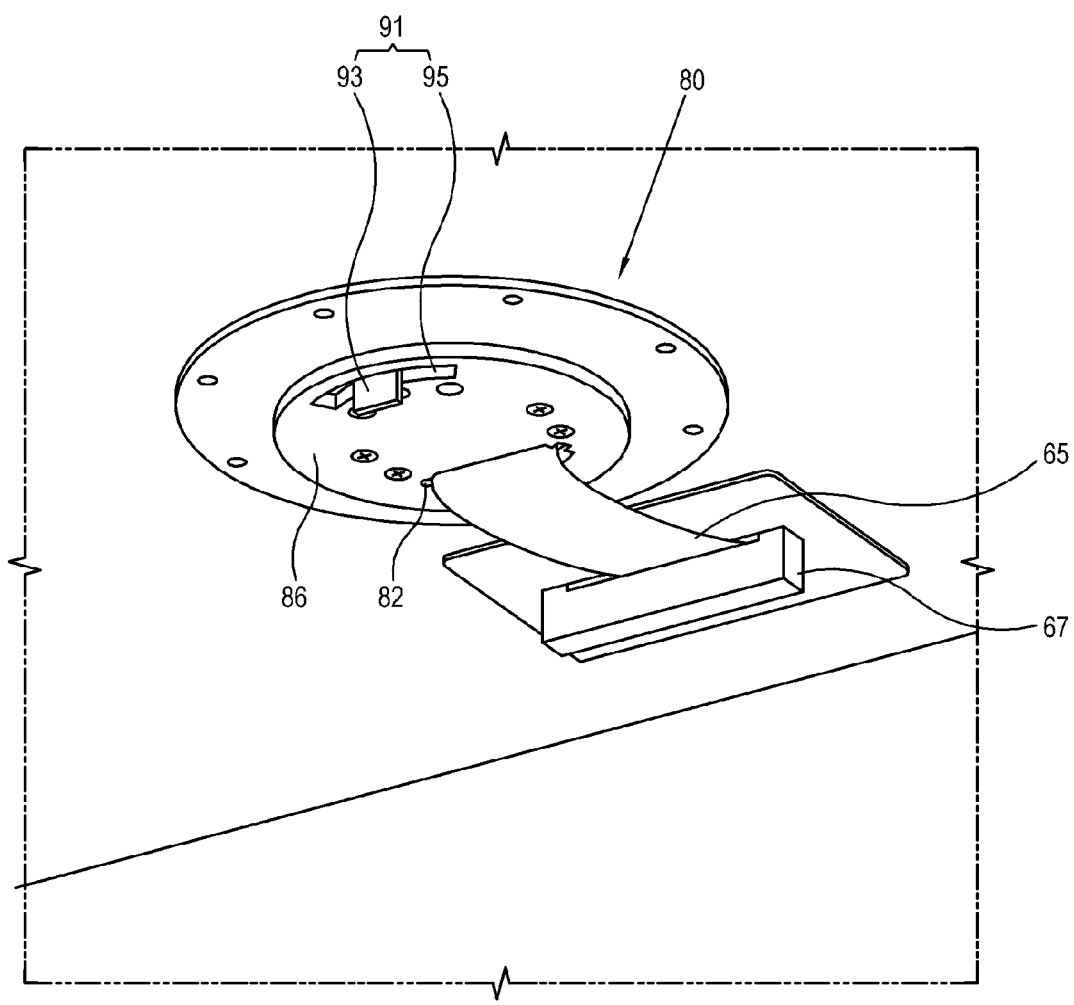
FIGS. 8 and 9 are respectively a perspective view and an exploded perspective view of a swivel unit of the display apparatus according to the first exemplary embodiment.

In addition, although it is illustrated in FIG. 8 that the upper and lower LED arrays 18a1, 18a3, 18a4 and 18a6 are formed in the upper and lower portions in the left and right sides, respectively, they may be implemented by joining a plurality of shorter LED arrays (not shown).

Figure 5:
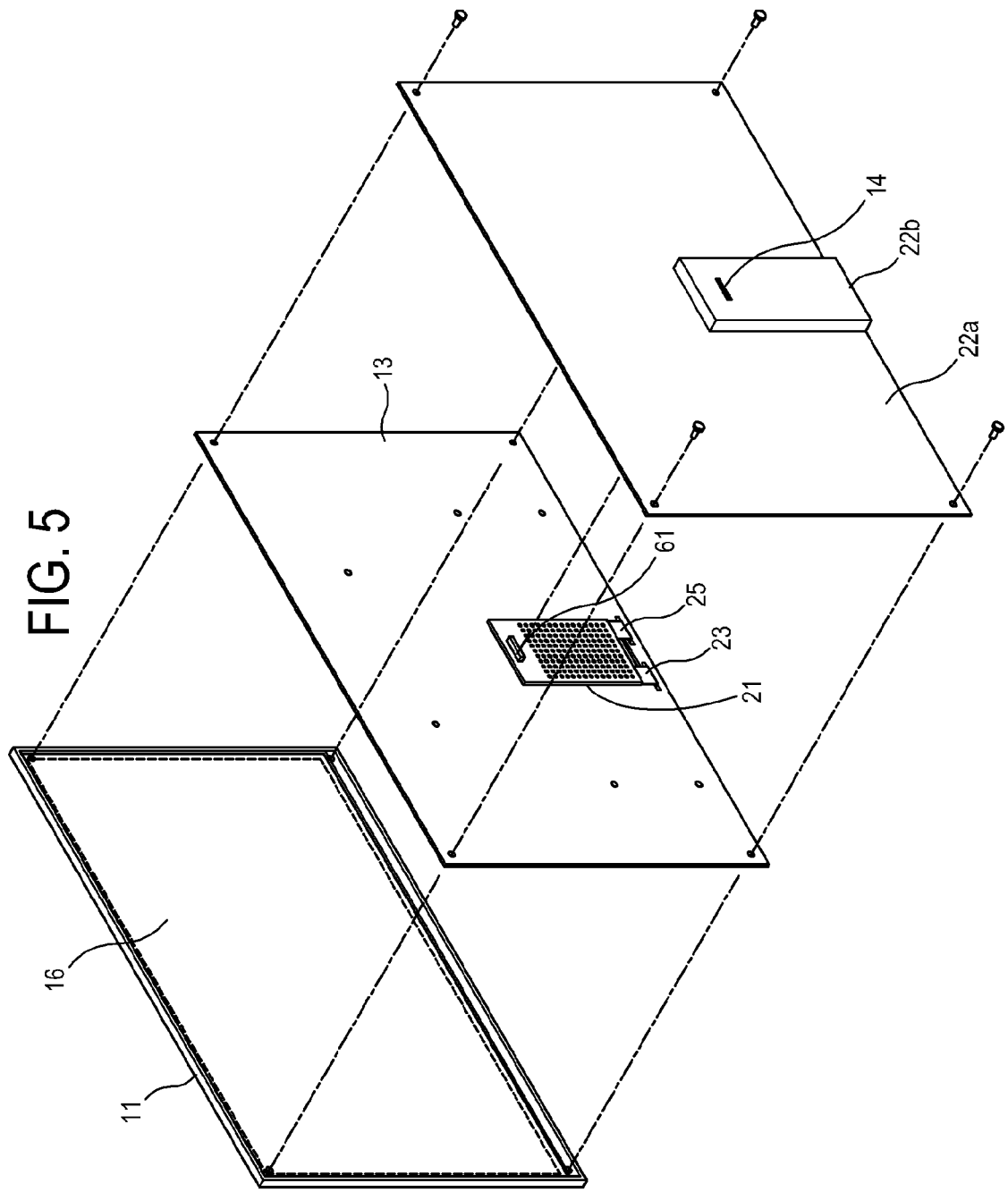
FIG. 5 is a perspective view showing another exemplary embodiment of a rear cover of the display unit in the display apparatus of FIG. 4.

FIG. 5 is a perspective view showing another exemplary embodiment of the rear cover of the display unit in the display apparatus in this exemplary embodiment. As shown in FIG. 5, a rear cover 22a is formed to cover the entire back side of the rear chassis 13 unlike the rear cover 22 of FIG. 4. Specifically, in addition to covering the entire back side of the rear chassis 13, the rear cover 22a includes a projecting board cover portion 22b formed to cover the panel driving board 21. The display connector opening 14 is formed in the projecting board cover portion 22b. Thus, by covering the entire back side of the rear chassis 13, the rear cover 22a can cover a rear region of the display unit 10 more safely.

Thus, a structure of the display unit 10 of the display apparatus 1 according to the first exemplary embodiment can be simplified by mounting the display connector 61 on the panel driving board 21 with a timing controller formed thereon without using a separate board for supporting the display connector 61. However, it is to be understood that the panel driving board 21 may be excluded from the display unit 10 of the display apparatus 1, in which case the panel driving board 21 excluded from the display panel 10 may be mounted on the main body 30 or a separate device.

Figure 3:
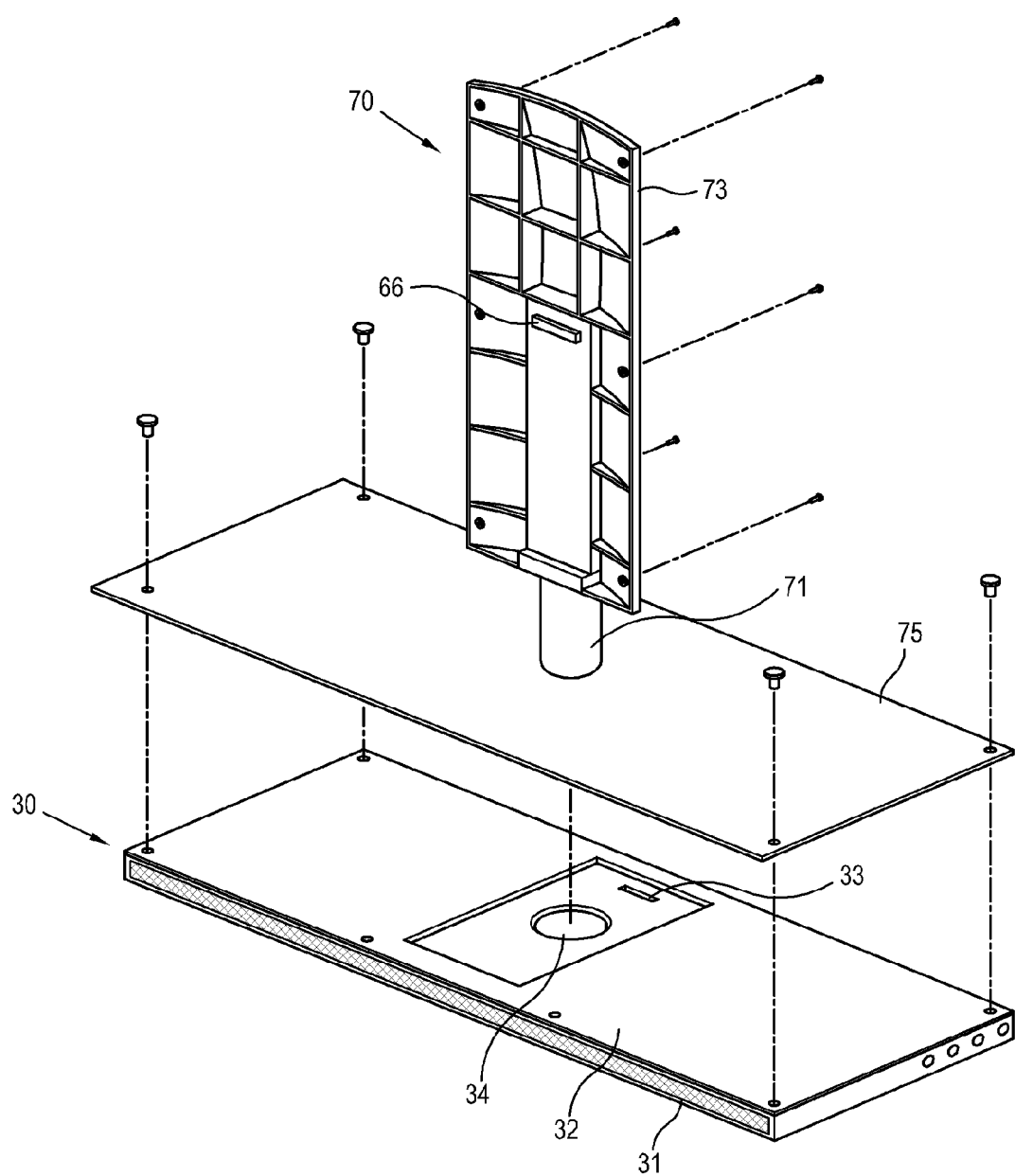
FIG. 3 is an exploded perspective view of a stand unit in the display apparatus of FIG. 1.
Figure 6:
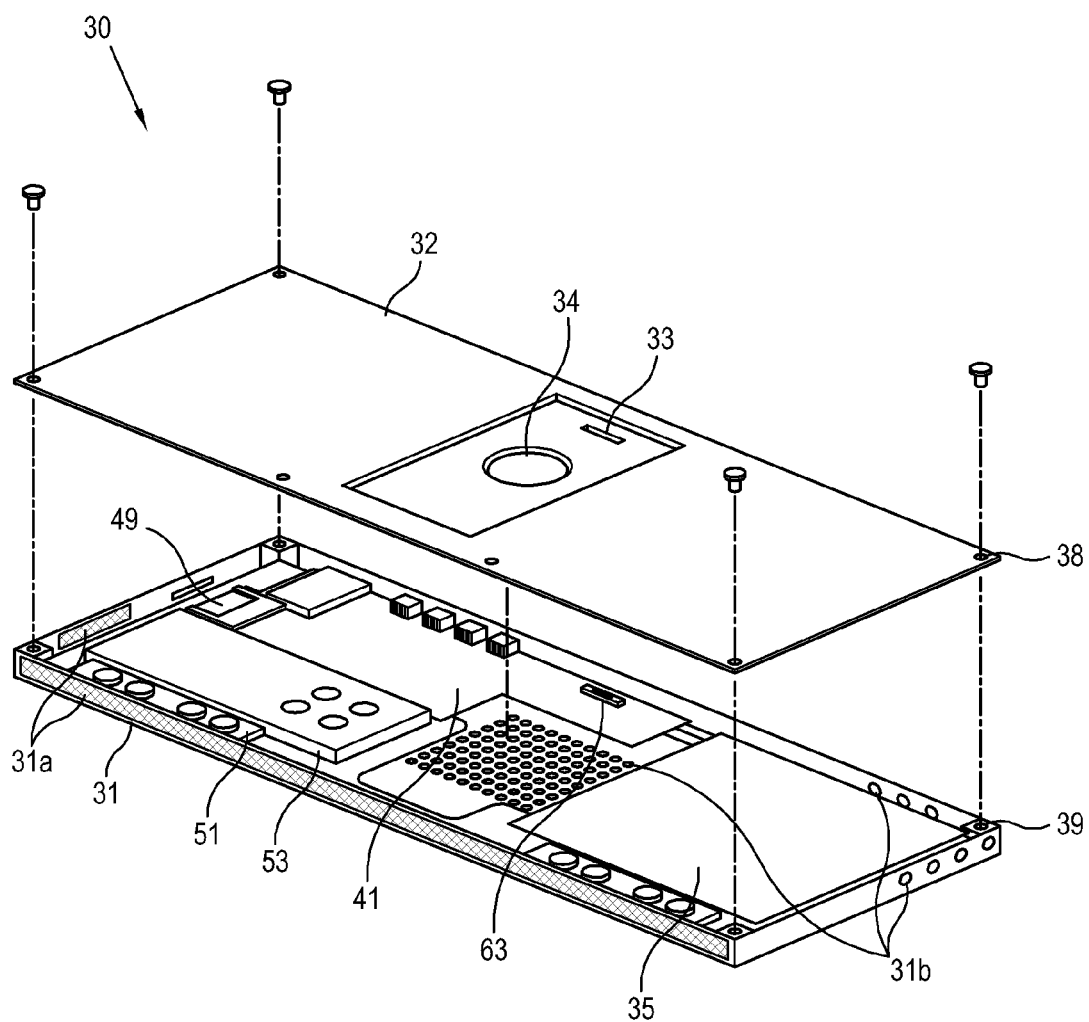
FIG. 6 is an exploded perspective view of a main body in the display apparatus of FIG. 2.
Figure 7:
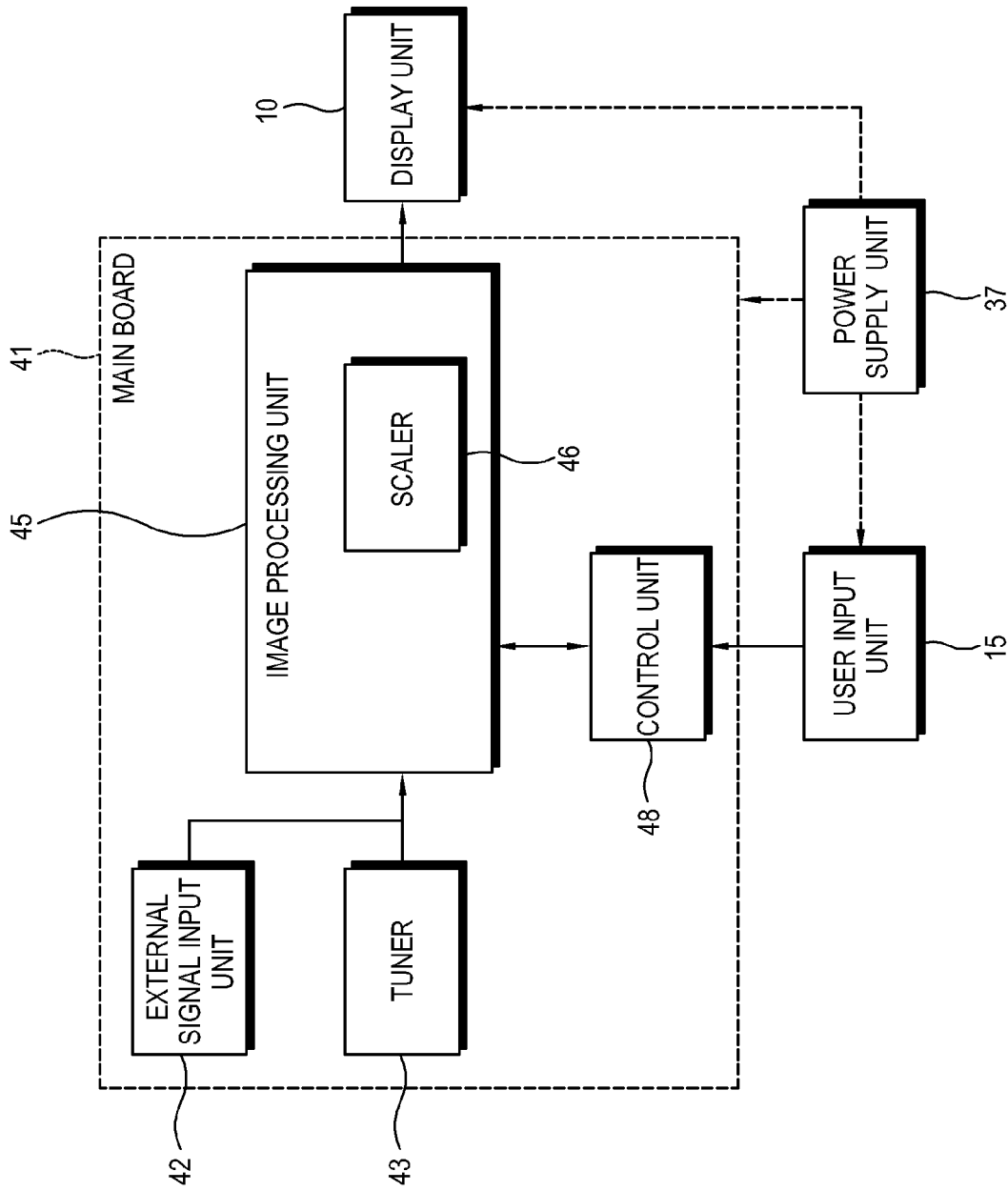
FIG. 7 is a control block diagram of the display apparatus according to the first exemplary embodiment.

As shown in FIGS. 3, 6 and 7, the main body 30 includes a main body casing 31 which shapes an apparatus external appearance, a power board 35 which is accommodated in the main body casing 31 and includes a power supply 37 formed thereon, and a main board 41 which is accommodated in the main body casing 31 and has the image processing unit 45 formed thereon. The main body 30 may further include at least one of a tuner 43 which receives broadcasting signal provided by broadcasting stations and an external signal input unit 42 which receives external signals such as digital versatile disk (DVD) signals. That is, it is shown in this example that the main body 30 includes both of the tuner 43 and the external signal input unit 42, but without being limited thereto, the main body 30 may include only one of the tuner 43 and the external signal input unit 42. The main body 30 may further include a speaker 51.

As one example, as shown in FIGS. 3 and 6, the main body casing 31 may be formed into a rectangular shape of predetermined height. The height of the main body casing 31 may be formed to be as small as possible such that various internal components such as boards accommodated therein can be arranged side by side without being stacked. This allows the main body casing 31 to be made slimmer than a conventional main body casing. However, it is to be understood that the main body casing 31 is not limited to the rectangular shape but may be formed into any shapes including a circular shape or an elliptical shape, and may be arranged with various stacked internal components such as boards accommodated therein. A main body cover 32 may be mounted on the top of the main body casing 31. Thus, the main body casing 31 according to the first exemplary embodiment can be easily and securely mounted on a plate such as a table. In addition, at least a region of the front and lateral sides of the plate of the main body casing 31 may be opened to easily emit sound of the speaker 51 and a woofer speaker 53 which will be described later. As one example, at least a region of the front and lateral sides of the main body casing 31 may include an opening which is formed corresponding to the speaker 51 and the woofer speaker 53 and in which a net member 31a may be mounted to prevent foreign substances from being introduced. In addition, a plurality of through holes 31b to circulate and cool air within the main body casing 31 may be formed in the plate of the main body casing 31. As one example, the plurality of through holes 31b may be formed in at least a region of the bottom, lateral sides and back side of the main body casing 31.

A main body connector opening 33 to expose the main body connector 63 is formed in the main body cover 32. In addition, a swivel unit accommodating unit 34 to accommodate a swivel unit 80, which will be described later, is formed in the main body cover 32. The main body cover 32 may be fastened to the main body casing 31 by means of screws which are jointed to a joint 39 of the main body casing 31 through a joint hole 38 of the main body cover 32. However, the main body cover 32 is not limited thereto but may be fastened to the main body casing 31 through various means such as hook coupling.

Thus, the main body cover can prevent parts accommodated in the main body casing 31 from being exposed to the outside and a connection cable 65 of a connection unit, which will be described later, can be combined to the main body connector 63 via the main body connector opening 33.

As one example, the tuner 43 and the external signal input unit 42 are mounted on the main board 41. In addition, the main board 41 is provided with the image processing unit 45 which processes image signals input from the tuner 43 or the external signal input unit 42 such that the signals can be displayed on the display unit 10, and the control unit 48 which controls the image processing unit 45 and so on. In addition, the main board 41 may be mounted with a variety of connection ports including a common interface (CI) slot 49. As one example, the main board 41 may be placed in a rear region of the main body casing 31 such that the variety of connection ports mounted thereon can be interconnected in the lateral sides or rear side of the main body 30.

The image processing unit 45 processes broadcasting signals received from the tuner 43 or image signals received from an external imaging device such as DVD such that these signals can be displayed on the display unit 10. The image processing unit 45 may further include a scaler 46 which outputs an image signal scaled to meet a resolution of the display unit 10. That is, the image processing unit 45 performs an A/D converting function for converting input image signals of various formats into digital image signals of a predetermined format, a digital coding function, a predetermined format converting function, etc., under control of the control unit 48. The scaler 46 may receive digital and/or analog image signals and perform a scaling function for adjusting a vertical frequency, a resolution, an aspect ratio, etc. to an output standard of the display unit 10.

In this manner, the display apparatus 1 according to this exemplary embodiment is configured to output the image signals scaled by the image processing unit 45 of the main body 30 to the display unit 10 via the main body connector 63 and the display connector 61 and, accordingly, the display unit 10 can be formed to be slimmer than a conventional display unit since there is no need to mount a separate image processing structure on the display unit 10.

The power supply unit 37 provided on the power board 35 is configured to supply required power to the main body 30 and the display unit 10. That is, as one example, the power supply unit 37 is configured to supply power to all components which require power, including the display panel 17 of the display unit 10, the backlight unit 18 and other components, via the main body connector 63 and the display connector 61. Thus, the display unit 10 can be more simply formed to be slimmer since there is no need to mount a separate power supplying connection structure, except for the image signal transfer connection unit, on the display unit 10. In addition, as one example, the power board 35 is arranged in parallel to the main board 41 and one side of the woofer speaker 53, which will be described later, in the main body casing 41. Thus, the main body casing 31 can be formed to be slimmer.

The power to be used to drive the light source 18*a* of the backlight unit 18, which is supplied from the power supply unit 37, and the image signals processed by the image processing unit 45 are transmitted from the main body 30 to the display unit 10 via the main body connector 63 and the display connector 61, as described above.

Figure 19:
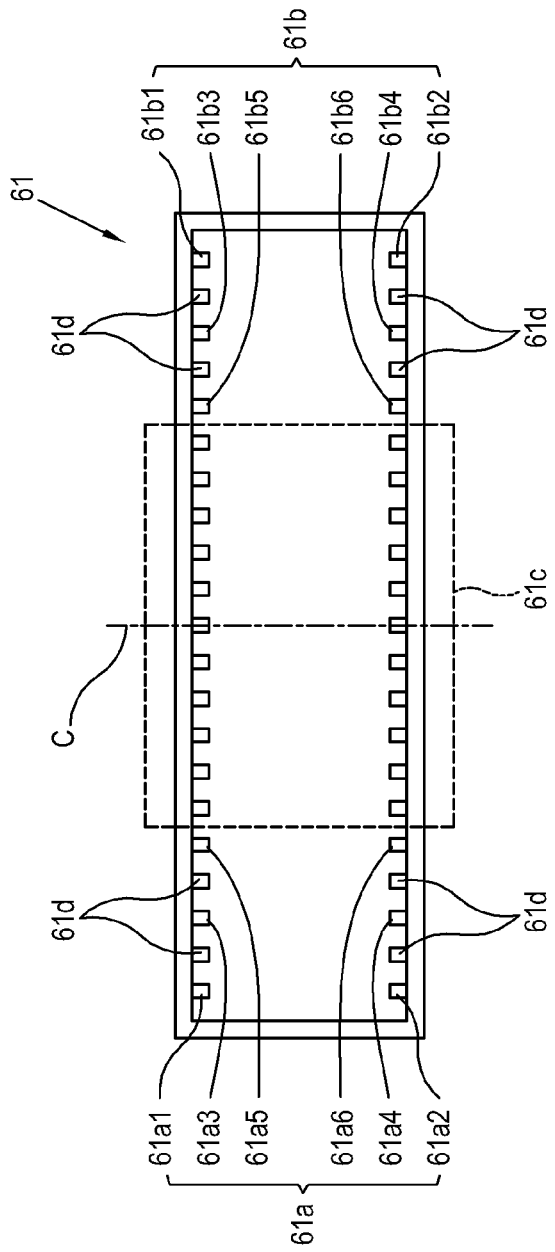
FIG. 19 is an enlarged view of a display connector of FIG. 4.

More specifically, as shown in FIGS. 19 to 21, the display connector 61 includes a plurality of signal pins 61*a*, 61*b* and 61*c* for signal communication with the main body connector 63. The display connector 61 may be provided to correspond to the main body connector 63 for signal communication.

The plurality of signal pins 61*a*, 61*b* and 61*c* includes left LED power pins 61*a* which supply power to the left LED arrays 18*a*1, 18*a*2 and 18*a*3; image signal pins 61*c* which deliver the image signals; and right LED power pins 61*b* which supply power to the right LED arrays 18*a*4, 18*a*5 and 18*a*6 and face the left LED power pins 61*a* with the image signal pins 61*c* interposed therebetween. In this exemplary embodiment, the left LED power pins and the right LED power pins may be called first power pins and second power pins, respectively. A control signal pin (not shown) to deliver a control signal input through the user input unit 15 to the main body 30 may be provided within a region of the image signal pins 61*c*.

As the left LED power pins 61*a* and the right LED power pins 61*b* are apart from each other, it is possible to prevent signal interference between adjacent pins and reduce noise. As shown in FIGS. 20 and 21, since a plurality of LED elements L in each of the LED arrays 18*a*1, 18*a*2, 18*a*3, 18*a*4, 18*a*5 and 18*a*6 is connected in series, a relatively high voltage is applied across the LED power pins 61*a* and 61*b* in order to drive the plurality of LED elements L. For example, a relatively low voltage such as 3.3V, 5V or 12V is applied across the image signal pins 61*c*, while a relatively high voltage such as several hundreds V is applied across the LED power pins 61*a* and 61*b*. For example, assuming that the left and upper LED array 18*a*1 is composed of 60 LED elements L which are connected in series and are driven at 3.5 V, power having a voltage of 210V (=3.5 V×60) is input to power pins 61*a*1 and 61*a*2 of the left LED power pins 61*a* and may be accordingly applied to each LED element L via the power input terminal S.

In this manner, by distributing the LED power pins applied with the relatively high voltage in the left and right sides of the image signal pins 61*c* with the image signal pins 61*c* interposed between the LED power pins, it is possible to reduce signal interference and noise.

The pair of power pins 61*a*1 and 61*a*2 of the left LED power pins 61*a* is used to provide power to the left and upper LED array 18*a*1, while the remaining two pairs of power pins 61*a*3 and 61*a*4; 61*a*5 and 61*a*6 are used to provide power to the left and lateral LED array 18*a*2 and the left and lower LED array 18*a*3, respectively.

In this exemplary embodiment, since the power to be supplied to the upper and lower LED arrays 18*a*1 and 18*a*3 having the number of LED elements L larger than that of the lateral LED array 18*a*2 is greater than the power to be supplied to the lateral LED array 18*a*2, the power pins 61*a*1, 61*a*2, 61*a*5 and 61*a*6 for supplying the power to the upper and lower LED arrays 18*a*1 and 18*a*3 may be arranged in such a manner that these pins are farthest from each other. More specifically, as shown in FIG. 19, the power pins 61*a*3 and 61*a*4 for supplying power to the lateral LED array 18*a*2 may be interposed between the power pins 61*a*1 and 61*a*2 and the power pins 61*a*5 and 61*a*6 for supplying power to the upper and lower LED arrays 18*a*1 and 18*a*3, respectively.

In addition, the left LED power pins 61*a*1, 61*a*2, 61*a*3, 61*a*4, 61*a*5 and 61*a*6 may be arranged to be apart from each other with unused pins 61*d* interposed therebetween in order to reduce mutual signal interference between the pins. Although the left LED power pins 61*a*1, 61*a*2, 61*a*3, 61*a*4, 61*a*5 and 61*a*6 are illustrated in the above, this illustration may be equally applied to the right LED power pins 61*b*1, 61*b*2, 61*b*3, 61*b*4, 61*b*5 and 61*b*6 symmetrically with respect to the symmetrical line C, and therefore, explanation thereof will be omitted for the purpose of clarity.

The speaker 51 is built in the main body casing 31, as one example, and may be arranged in the front side of the main body casing 31 such that sound can be emitted forward. However, it is to be understood that the speaker 51 may be arranged in other different locations including the rear side and left and right sides of the main body casing 31. In addition, as one example, the woofer speaker 53 may be further included in the main body casing 31.

As one example, the woofer speaker 53 is arranged in the main body casing in parallel to one side of the front side of the main board 41. However, it is to be understood that the components such as the woofer speaker 53, the power board 35 and the main board 41 mounted on the main body casing 31 are not limited thereto but may be arranged in other different locations. Thus, the main body casing 31 can be formed to be slimmer and can provide high-quality sound to user.

As shown in FIGS. 3 to 8, the connection unit may further include the connection cable 65 (FIG. 8) for interconnecting the display connector 61 and the main body connector 63. As one example, the connection unit may include one main body connector 63, one display connector 61, and one connection cable 65 for interconnecting the one display connector 61 and the one main body connector 63. Thus, the display apparatus 1 according to the first exemplary embodiment is simple in its structure and is easily assembled and dissembled in that the image signals and the power can be delivered from the main body 65 to the display unit 10 via one main body connector 63, one connection cable 65 and one display connector 61.

As one example, the display connector 61 is mounted on the panel driving board 21. However, it is to be understood that the display connector 61 is not limited thereto but may be mounted on a separate board provided in the display unit 10. As one example, the display connector 61 projects through the display connector opening 14 formed in the rear cover 22. However, the display connector 61 is not limited thereto but may be formed not to project through the display connector opening 14 such that it can be coupled to the connection cable 65.

As one example, the main body connector 63 is mounted on the main board 41 arranged in the main body casing 31. However, it is to be understood that the main body connector 63 is not limited thereto but may be mounted on a separate board provided in the main body casing 31. As one example, the main body connector 63 is formed not to project through the main body connector opening 33 formed in the main body cover 32. However, the main body connector 63 is not limited thereto but may be formed to project through the main body connector opening 33 formed in the main body cover 32 such that it can be coupled to the connection cable 65.

The connection cable 65 includes a first connector 66 and a second connector 67 at its both end portions, which can be coupled to the display connector 61 and the main body connector 63, respectively. The connection cable 65 may be mounted in the inner side of a stand unit 70 which will be described later. That is, as one example, the connection cable 65 may be mounted in the inner side of the stand unit 70, which will be described later, such that the first connector 66 and the second connector 67 can be coupled to the display connector 61 and the main body connector 63, respectively. Thus, the apparatus external appearance can become simple by preventing the connection cable 65 from being exposed to the outside.

The display apparatus 1 according to the first exemplary embodiment further includes the stand unit 70 to support the display unit 10 with respect to the main body 30 mounted on a mount such as a table. As shown in FIG. 3, the stand unit 70 is erect, upright, and has a lower side coupled to the main body 30 and an upper side coupled to the display unit 10. Specifically, the stand unit 70 includes a display support 73 coupled to the display unit 10, a plate-like main body support 75 coupled to the main body 30, and a stand 71 coupled to the display support 73 and the main body support 75.

The stand 71 has an upper side coupled to the display support 73 and a lower side erected with respect to the main body support 75. As one example, the stand 71 is made of metallic material to support the weight of the display unit 10 but, without being limited thereto, may be made of different materials such as plastics having strength enough to support the weight of the display unit 10. For example, the stand 71 may be made of transparent material such as transparent plastics, and etc.

As one example, the display support 73 is formed into a plate shape which can be fastened to the rear chassis 13 of the display unit 10 by means of screws and the like and its lower region is coupled to an upper region of the stand 71. As one example, the display support 73 is made of plastic material to support the display unit 10 but, without being limited thereto, may be made of different materials such as metal and so on. The first connector 66 of the connection cable 65 is mounted on the display support 73 such that the first connector 66 can be jointed to the display connector 61 when the display support 73 is fastened to the rear chassis 13 of the display unit 10.

As one example, the main body support 75 may be arranged in the upper side of the main body cover 32 and may be fastened to the main body cover 32 or the main body casing 31 by means of screws and the like. The main body support 75 is made of metal such that the stand 71 can be erected and coupled to the plate of the main body support 75. However, without being limited thereto, the main body support 75 may be made of different materials such as plastics to support the stand 71. The second connector 67 of the connection cable is mounted on the main body support 75 such that the second connector 67 can be jointed to the main body connector 63 when the main body support 75 is fastened to the main body cover 32. The display apparatus 1 according to the first exemplary embodiment may further include the swivel unit 80 to allow the display unit 10 to be rotated around a vertical axial line.

Figure 9:
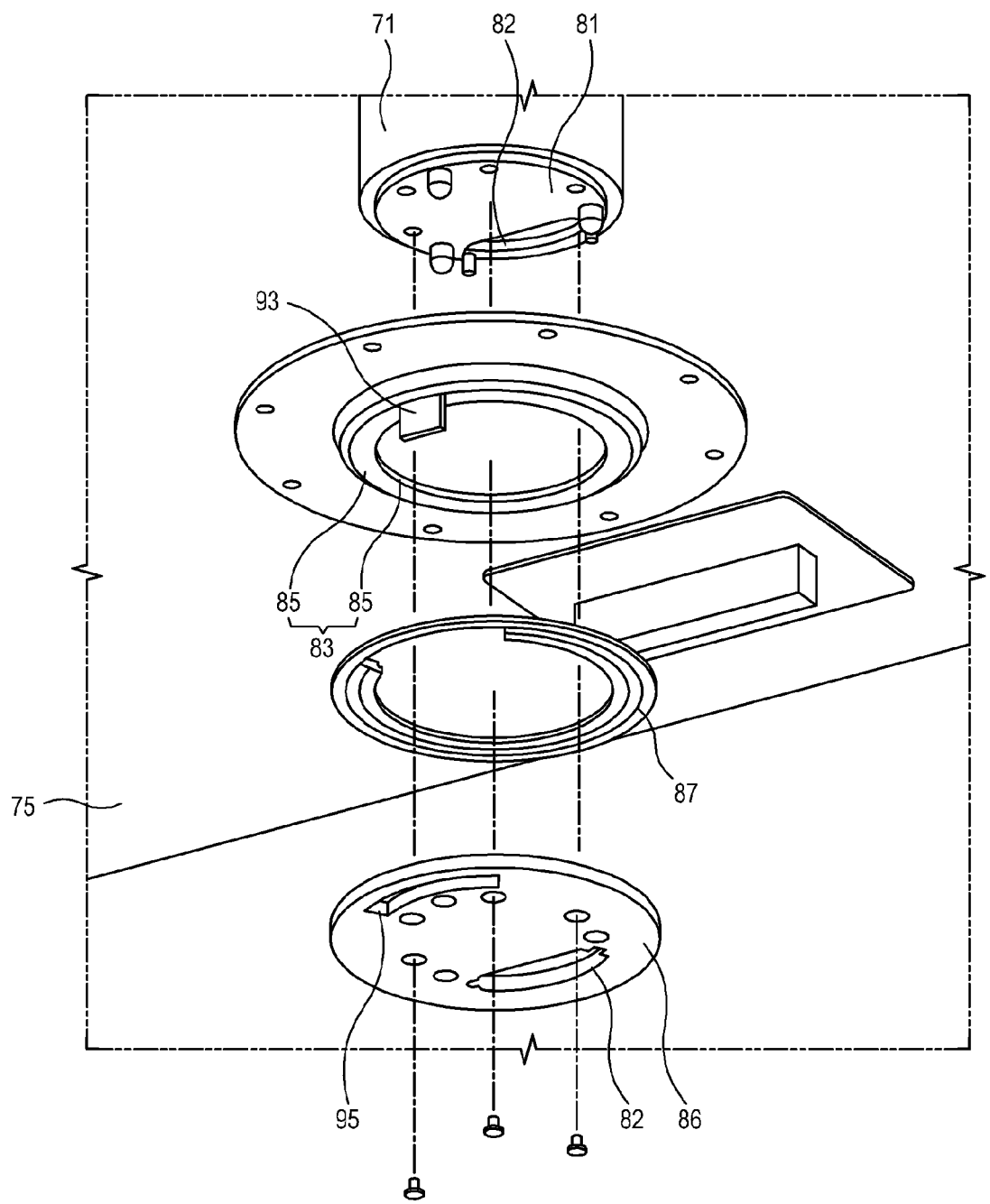

As shown in FIGS. 8 and 9, the swivel unit 80 is configured such that the stand unit 80 to support the display unit 10 can be rotated with respect to the main body 30 around a longitudinal axial line of the stand unit 70. As one example, the swivel unit 80 includes a swivel member 81 which is coupled to the stand unit 70 and is rotated along with the stand unit 70, a guide member 83 which is coupled to the main body 30 and guides rotation of the swivel member 81, a swivel bracket 86 which is coupled to the swivel member 81, with the guide member 83 interposed therebetween, and is rotated along with the swivel member 81, and a sliding member 87 interposed between the guide member 83 and the swivel bracket 86. The swivel member 81 is formed to project downwardly toward the main body support 85a and the swivel unit accommodating unit 34 to accommodate the swivel unit 80 is formed in the main body cover 32. As one example, the swivel unit 80 may further include a swivel angle limiting means 91 to limit a rotation angle of the swivel member 81.

As one example, the swivel member 81 is formed in the bottom of the stand 71 such that the swivel member 81 can be rotated along with the stand unit 70. A cable opening 82 through which the connection cable 65 is passed is formed in the lower side of the swivel member 81.

The guide member 83 is formed in the main body support 75 such that the guide member 83 can accommodate the swivel member 81 and guide the rotation of the swivel member 81. The guide member 83 includes a swivel support 84 to accommodate and support the swivel member 81, and a swivel opening 85b formed in the central portion of the swivel support 84 in order to fasten the swivel member 81 to the swivel bracket 86.

The swivel bracket 86 is fastened to the swivel member 81 through the swivel opening 85 by means of screws and the like such that the swivel bracket 86 can be rotated along with the swivel member 81. The swivel bracket 86 is formed to have an area larger than that of the swivel opening 85 in order to prevent the swivel bracket 86 from slipping through the swivel opening 85. Thus, the swivel member 81 can be swiveled with respect to the guide member 83. The cable opening 82 is also formed in the swivel bracket 86 such that the connection cable 65 can be passed through the cable opening 82. As one example, the sliding member 87 is inserted between the guide member 83 and the swivel bracket 86 and is made of an acetal material to minimize a sliding friction between the guide member 83 and the swivel bracket 86. However, without being limited thereto, the sliding member 87 may be made of different materials including plastic or metal as long as they can minimize sliding friction. As one example, the sliding member 87 is formed into a ring shape. The sliding member 87 may be formed to be larger than the swivel opening 85 and equal to or smaller than the swivel bracket 86. Thus, the sliding member 87 can be inserted between the lower side of the guide member 83 and the upper side of the swivel bracket 86 in order to minimize the sliding friction between the guide member 83 and the swivel bracket 86.

As one example, the swivel angle limiting means 91 includes a projection 93 which is provided in the guide member 83 and a projection accommodating portion 95 which accommodates the projection 93 and is formed of an arc-like groove such that the projection 93 can be rotated by a predetermined angle. Alternatively, it is to be understood that the projection 93 may be formed in the swivel bracket 86 and the projection accommodating portion 95 may be formed in the guide member 83. Thus, the display apparatus 1 according to the first exemplary embodiment can limit a swivel angle of the display unit 10 by means of the formed swivel angle limiting means 91.

With the above configuration, the display apparatus 1 according to the first exemplary embodiment can configure the display unit 10 which displays an image, and the main body 30 which has the power supply unit 37 for outputting power and the image processing unit 45 for outputting image signals, separately, and can provide the connection unit for interconnecting the display unit 10 and the main body 30. Thus, the display unit 10 can be formed to be slim as most as possible, thereby improving user's convenience in installation of the display apparatus.

Figure 10:
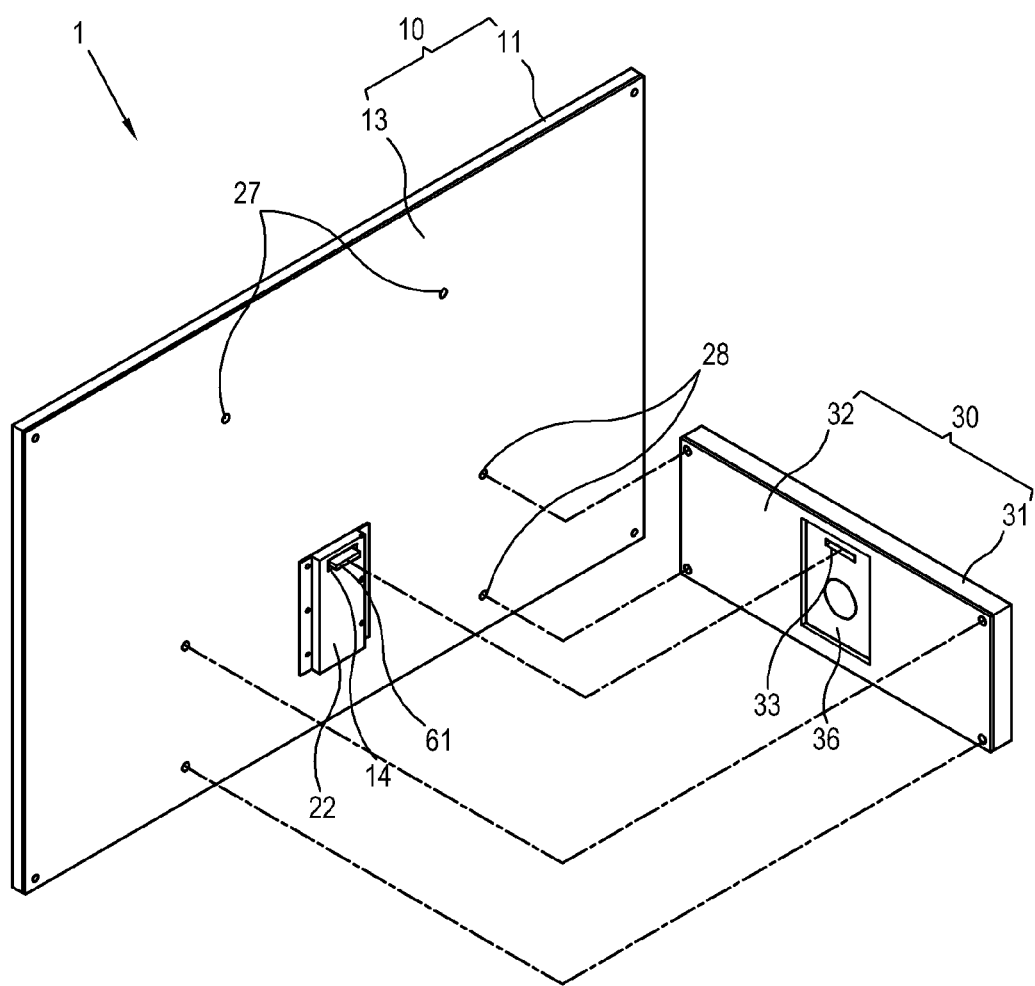
FIGS. 10 and 11 are respectively an exploded perspective view and a side view of a display apparatus according to a second exemplary embodiment.
Figure 11:
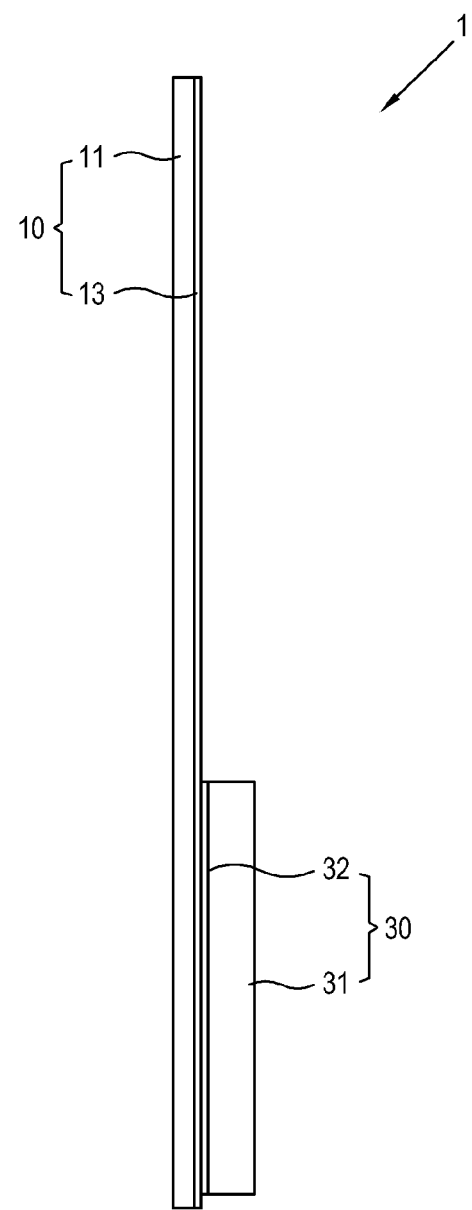

FIGS. 10 and 11 are respectively an exploded perspective view and a side view of a display apparatus according to a second exemplary embodiment. As shown in these figures, the display apparatus 1 is configured to allow the main body 30 to be directly coupled to the display unit 10 without using the stand unit 70 of the above-described first exemplary embodiment. That is, in the display apparatus 1, the main body connector 63 of the main body 30 is directly coupled to the display connector 61 of the display unit 10. As one example, the main body 30 is coupled to a main body joint 28 provided in the back side of the display unit 10 by means of screws and the like. The display connector 61 is exposed backward from the back side of the display unit 10, while the main body connector 63 is exposed from the main body 30 toward the display unit 10, thereby allowing them to be easily coupled.

As one example, a rear cover accommodating unit 36 for accommodating the rear cover 22 coupled to the rear chassis 13 may be formed in the main body cover 32 of the main body 30. Thus, when the main body 30 is coupled to the back side of the display unit 10, since the rear cover 22 coupled to the back side of the display unit 10 is inserted in the rear cover accommodating unit 36 of the main body 30, the display apparatus 1 according to the second exemplary embodiment can be formed to be slim. However, without being limited thereto, the main body 30 may be coupled to the lower side or lateral sides of the display unit 10.

With the above configuration, the display apparatus according to the second exemplary embodiment can be easily installed on a wall and so on. As one example, a stud 28 is provided in the rear chassis 13 of the display unit 10 in order to easily install the display apparatus 1 on the wall using a wire or the like. However, without being limited thereto, it is to be understood that the display apparatus 1 may be installed on the wall using various forms of wall jigs.

The bottom of the main body 30 may be equal to or higher than the bottom of the display unit 10. Thus, when a user looks at the display unit 10 in front, the main body 30 is not exposed below the display unit 10, thereby providing a simpler external appearance.

Figure 12:
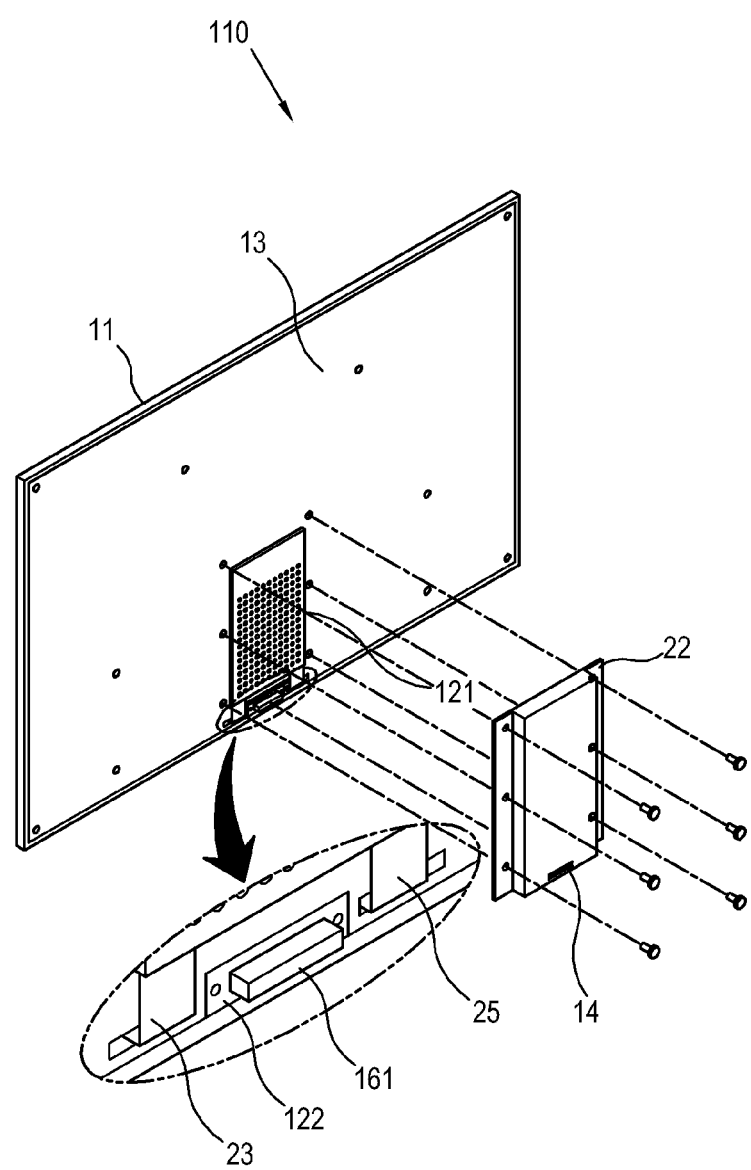
FIGS. 12 and 13 are exploded perspective views of a display unit in a display apparatus according to a third exemplary embodiment.
Figure 13:
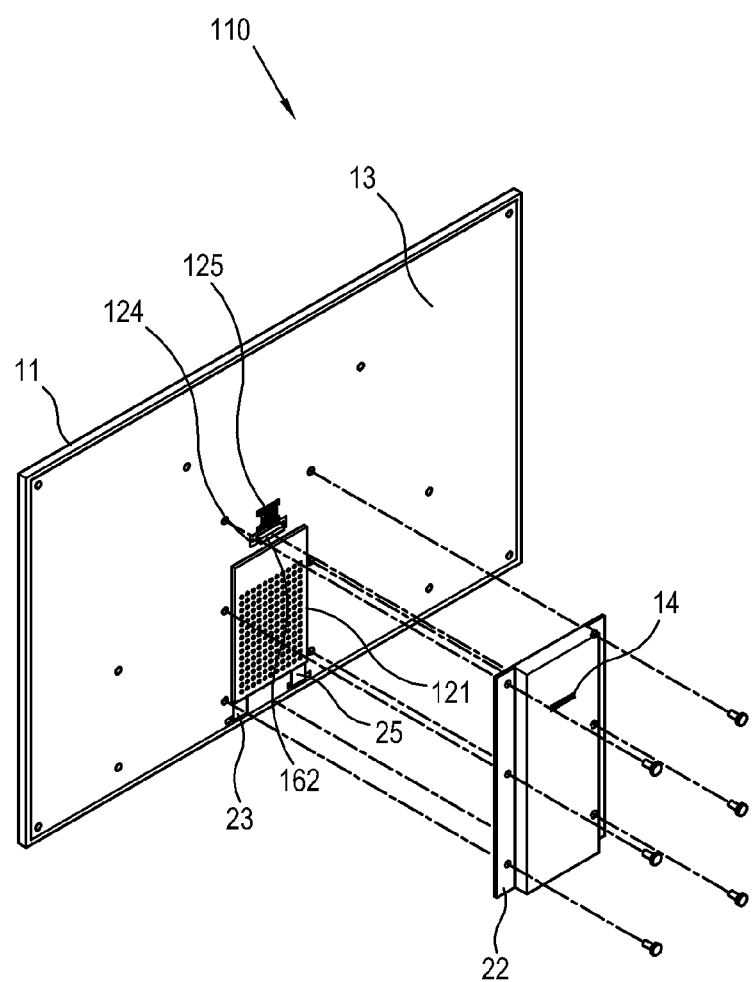

FIGS. 12 and 13 are exploded perspective views of a display unit in a display apparatus according to a third exemplary embodiment. The display apparatus shown in FIG. 12 is characterized in that a display connector 161 of a display unit 110 is supported by a separate connector board 122 unlike the first exemplary embodiment. That is, in the third exemplary embodiment, the display connector 161 is mounted on the connector board 122 separated from the panel driving board 121 without being mounted on the panel driving board 121.

The display unit 110 includes the display panel 17 which displays an image, the panel driving board 121 which has a timing controller for controlling a time difference which occurs when image signals input from the image processing unit are displayed on the display panel, and the connector board 122 which supports the display connector 161.

The connector board 122 is electrically connected to the panel driving board 121 and the backlight unit 18 so that power and image signals delivered through the display connector 161 can be delivered to the panel driving board 121 and the backlight unit 18. As one example, the connector board 122 is mounted on the back side of the display unit 110 and the lower side of the rear chassis 13. A connection unit may be mounded in the stand unit 70 such that the connection unit can be coupled to the display connector 161.

The display apparatus shown in FIG. 13 is different from the display apparatus shown in FIG. 12 in that a connector board 124 to support a display connector 162 is arranged in the upper side of the panel driving board 121. The connector board 124 is electrically connected to the panel driving board 121 and the backlight unit 18 so that power and image signals delivered through the display connector 162 can be delivered to the panel driving board 121 and the backlight unit 18. As one example, a power cable 125 may be connected to the connector board 124 through the rear chassis 13 so that power can be supplied to the backlight unit 18 and so on, and a separate image cable (not shown) may be provided similar to the power cable 125. However, without being limited thereto, it is to be understood that the connector board 122 may be mounded in the back side of the rear chassis 13 in parallel to the panel driving board 121 at one side of the panel driving board 121 without being stacked with the panel driving board 121.

Thus, the display apparatus according to the third exemplary embodiment can be easily manufactured with no need to configure the panel driving board 121 complicatedly and the display unit 110 can be formed to be slim as most as possible, like the first exemplary embodiment, thereby improving user's convenience in installation of the display apparatus.

Components other than the above-described components in the display apparatus 1 according to the third exemplary embodiment have the same configuration as those in the first exemplary embodiment, and therefore, explanation thereof will be not repeated for the purpose of clarity. The display apparatus according to the third exemplary embodiment may be applied to the second exemplary embodiment.

Figure 14:
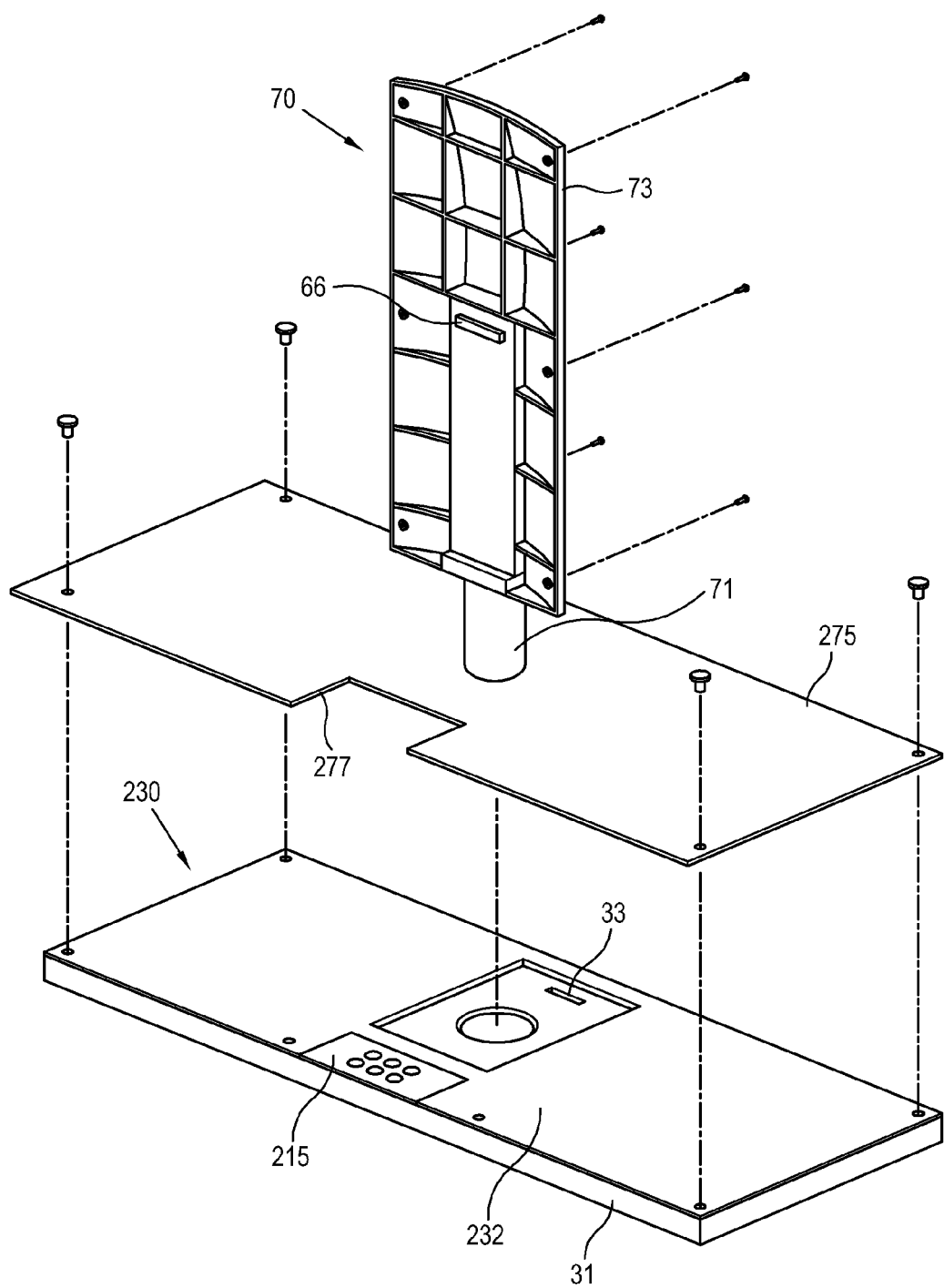
FIGS. 14 and 15 are an exploded perspective view and a perspective view of main bodies in display apparatuses according to fourth and fifth exemplary embodiments, respectively.
Figure 15:
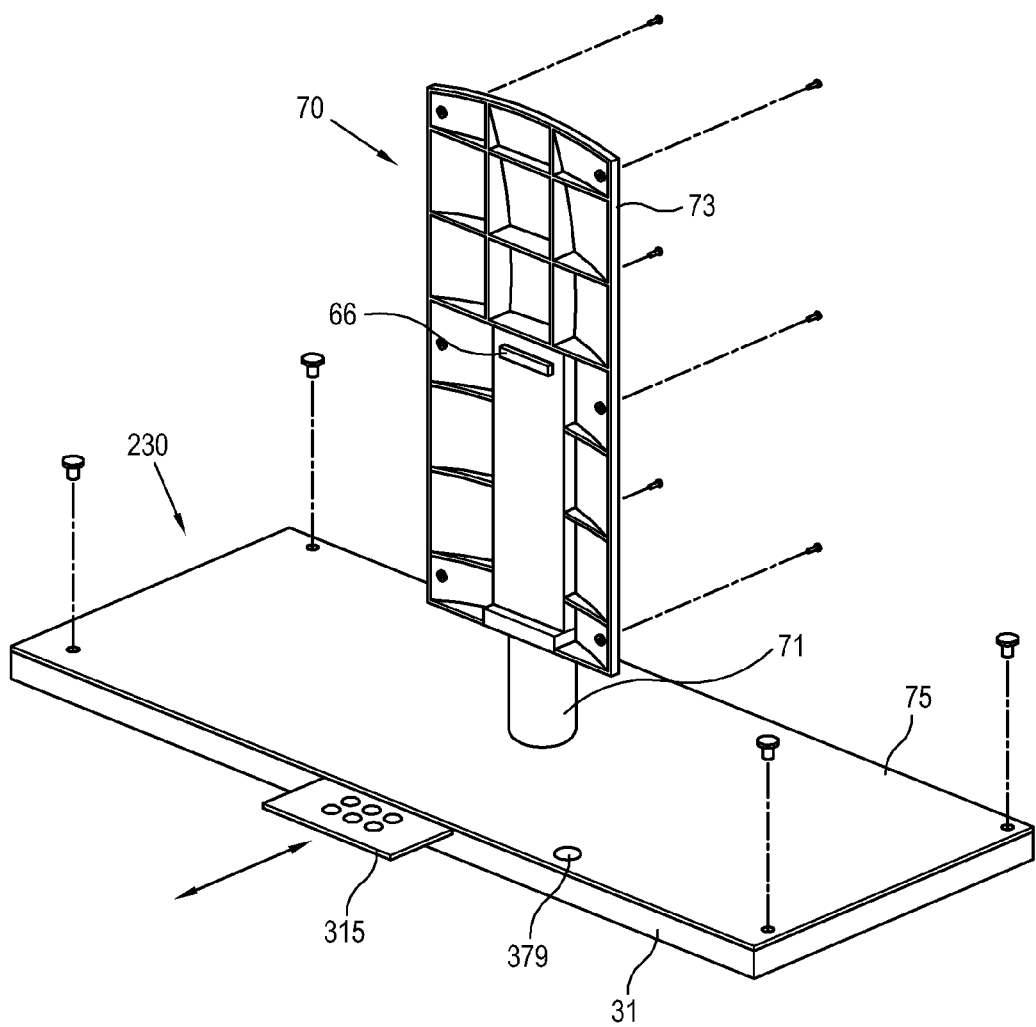

FIGS. 14 and 15 are an exploded perspective view and a perspective view of main bodies in display apparatuses according to fourth and fifth exemplary embodiments, respectively. As shown in FIG. 14, the display apparatus according to the fourth exemplary embodiment is characterized in that a main body 230 further includes a user input unit 215.

The user input unit 215 is formed at the top of the main body 230 such that a user can conveniently use the user input unit 215 when the main body 230 is mounted on an installation plate such as a table. As one example, the user input unit 215 is mounted on the front side of a main body cover 232. In addition, a cutaway portion 277 to expose the user input unit 215 mounted on the main body cover 232 is formed in a main body support 275. However, it is to be understood that the user input unit 215 may be formed in the front side or lateral sides of the main body 230 rather than the top of the main body 230.

As shown in FIG. 15, the display apparatus according to the fifth exemplary embodiment is characterized in that a user input unit 315 provided in the main body 230 can be slidably moved forward from the main body 230.

The user input unit 315 is formed at the top of the main body 230, as shown in FIG. 14. As one example, the user input unit 315 is mounted in the front side of the main body cover 232. However, there is no need to form a separate cutaway portion 277 to expose the user input unit 315 mounted on the main body cover 232 in the main body support 275. However, as shown in FIG. 14, the separate cutaway portion 277 to expose the user input unit 315 mounted on the main body cover 232 may be formed in the main body support 275. As one example, the user input unit 315 shown in FIG. 15 may further include a switch 379 to allow the user input unit 315 to be slidably moved forward from the main body 230. As one example, the switch 379 uses a capacitive touch sensor which is implemented by a difference between a capacitance generated when a user touches the switch 378 and a ground capacitance when the user touches no switch. However, without being limited thereto, the switch 379 may be implemented in different ways including a proximity sensor, a pressure sensor and so on.

As one example, the user input unit 315 may be provided to be moved forward and backward by means of an internal driving motor (not shown). Thus, a user can operate the switch 379 to automatically slide the user input unit 315. As one example, the switch 379 is provided on the top of the main body 230 but, without being limited thereto, may be provided in the front side or lateral sides of the main body 230. However, without being limited to the use of the switch 379, the user input unit 315 may be provided in different ways including a toggle switch to allow a user to receive or move forward the user input unit 315 by directly pressing the user input unit 315.

Figure 16:
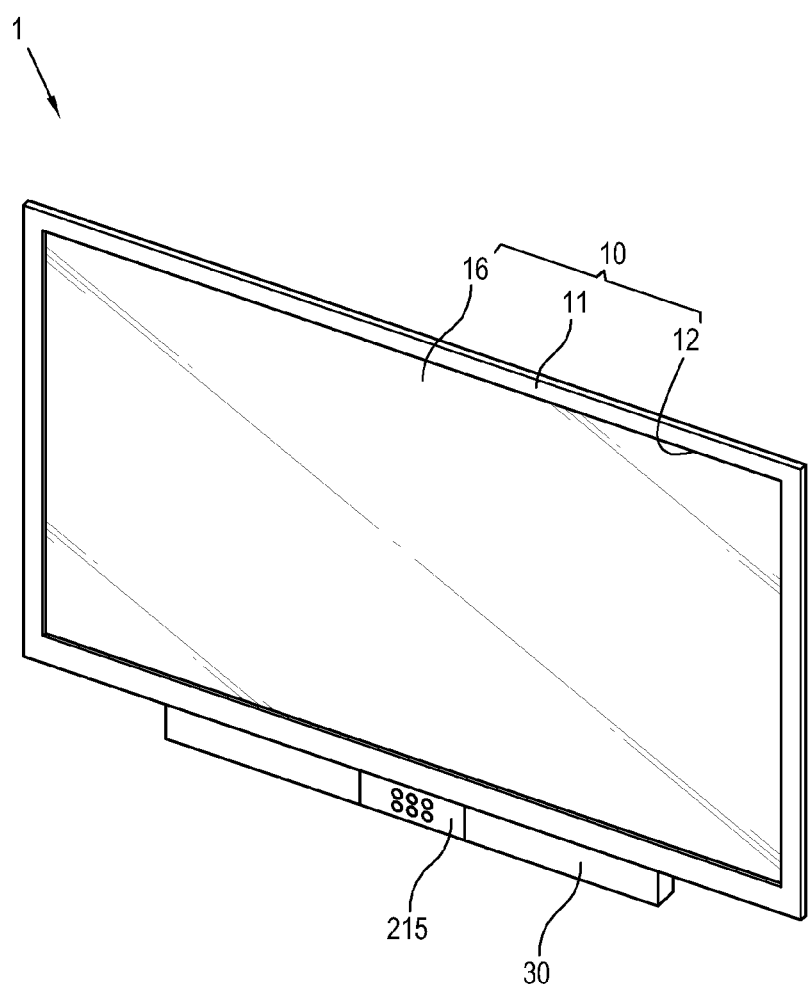
FIGS. 16 and 17 are a perspective view and a side view of display apparatuses according to sixth and seventh exemplary embodiments, respectively.
Figure 17:
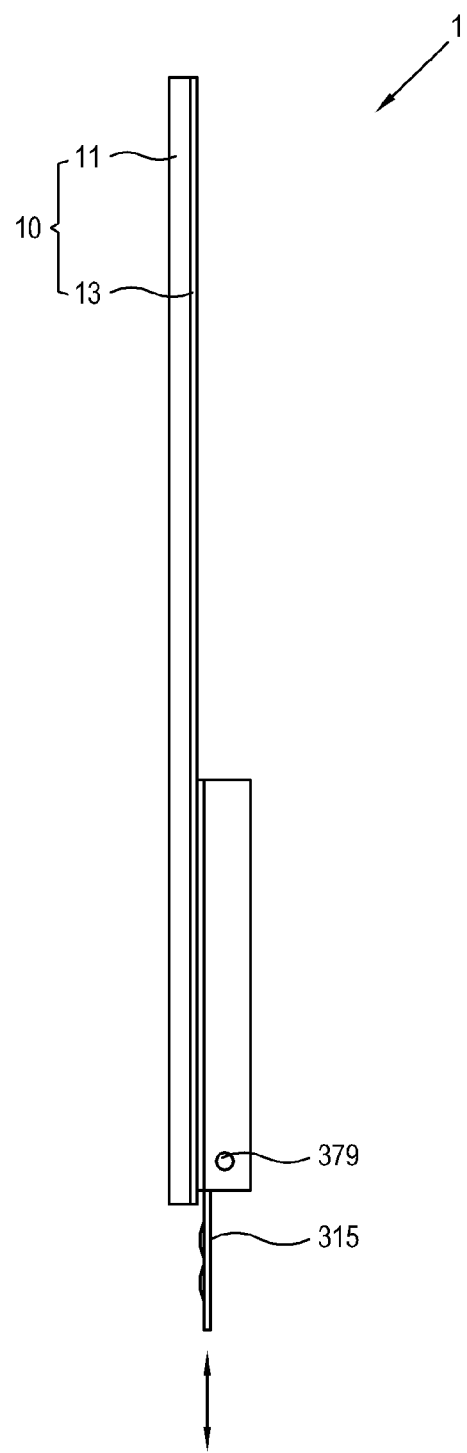

FIGS. 16 and 17 are a perspective view and a side view of display apparatuses according to sixth and seventh exemplary embodiments, respectively. As shown in FIG. 16, the display apparatus according to the sixth exemplary embodiment has the same configuration as that shown in FIG. 14 in that the main body 230 further includes the user input unit 215, but is different from that shown in FIG. 14 in that the main body 230 is directly coupled to the back side of the display unit 10. In addition, as shown in FIG. 16, the bottom of the main body 230 is formed to be lower than the bottom of the display unit 10 such that the user input unit 215 provided in the main body 230 can be exposed forward to allow a user to use the user input unit 215.

As shown in FIG. 17, the display apparatus according to the seventh exemplary embodiment has the same configuration as that shown in FIG. 15 in that the main body 230 further includes the user input unit 315, but is different from that shown in FIG. 15 in that the main body 230 is directly coupled to the back side of the display unit 10. In addition, for the seventh exemplary embodiment, there is no need to form the bottom of the main body 230 to be lower than the bottom of the display unit 10 such that a user can use the user input unit 315 provided in the main body 230. As one example, the switch 379 may be formed in the lateral sides of the main body 230. However, the switch 379 may be also formed in the bottom of the main body 230. In addition, as in the fifth exemplary embodiment, without being limited to the use of the switch 379, the user input unit 315 may be provided in different ways including a toggle switch to allow a user to receive or move forward the user input unit 315 by directly pressing the user input unit 315. Thus, the user can operate the switch 379 to slide the user input unit 315 downward and upward from the main body 230.

The user input units 215 and 315 shown in FIGS. 14 to 17 include a plurality of functional keys for performing broadcasting channel change, screen control, volume control and the like. Control signals input through the user input units 215 and 315 are delivered to the control unit 48 of the main body 230 and the control unit 48 controls the image processing unit 45 and so on based on the delivered control signals. Thus, a user can perform broadcasting channel change, screen control, volume control and the like through the user input units 215 and 315 provided in the main body 230, which results in improvement of user's convenience.

Components other than the above-described components in the display apparatuses according to the fourth to seventh exemplary embodiments have the same configuration as those in the first exemplary embodiment, and therefore, explanation thereof will be not repeated for the purpose of clarity. The display apparatuses according to the fourth to seventh exemplary embodiments may be applied to the second and third exemplary embodiments.

Below, a display apparatus 1*a* according to an eighth exemplary embodiment will be described with reference to FIGS. 22 to 30, in which like numerals refer to like elements described in the foregoing exemplary embodiments. For convenience, the display unit 10 (see FIG. 10) will be omitted in FIG. 22.

As shown in FIGS. 22 to 28, the display apparatus 1*a* according to the eighth exemplary embodiment includes a stand unit 70*a* supporting the display unit 10 (see FIG. 2) with regard to the main body 30, and a rear cover 26 covering the panel driving board 21 (see FIG. 4) mounted to the rear of the rear chassis 13 of the display unit 10 (see FIG. 2).

The stand unit 70*a* includes a display support 73 coupled to the display unit 10 (see FIG. 2); a main body support 75 coupled to the main body 30; and a stand 71 coupled to the display support 73 and the main body support 75.

Also, the stand unit 70*a* includes a connector cover 72 covering the first connector 66; and a coupling member 74 coupled to the connector cover 72 and the display support 73 to support the connector cover 72 and the display support 73.

The connector cover 72 may be provided as a conductor. For example, the connector cover 72 may include stainless steel, aluminum, copper or alloy of some or all of them. As necessary, the connector cover 72 may be made of a nonconductor such as a plastic synthetic resin externally coated with conductive metal. Besides, the material and shape of the connector cover 72 may vary as long as it is externally or internally conductive.

The connector cover 72 includes a first connector insertion hole 72a through which the first connector 66 is inserted and exposed toward the display connector 61; a plurality of fastening holes 72d for fastening the connector cover 72 to the display support 73 by fasteners (not shown); and a bending portion 72b coupled to the coupling member 74.

Figure 29:
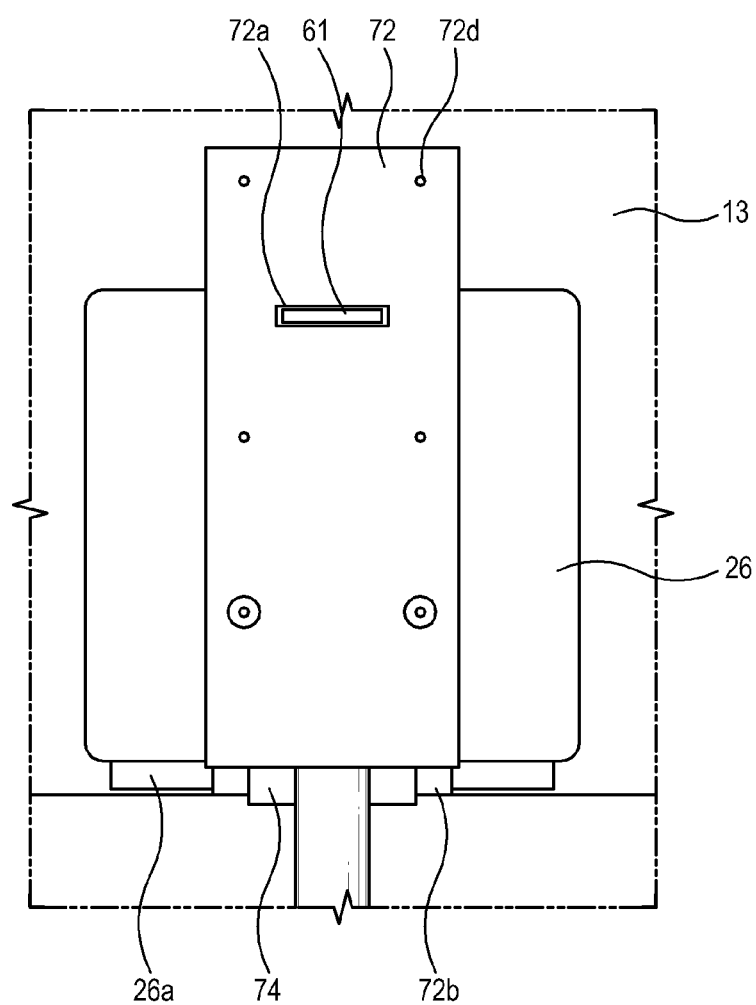
FIG. 29 is a schematic rear plan view for explaining that the stand unit of FIG. 22 and the rear cover of FIG. 28 are coupled to each other.

As shown in FIG. 29, the bending portion 72b is bent toward a flange 26a of the rear cover 26 (to be described later) so as to contact the flange 26a of the rear cover 26.

The coupling member 74 is interposed between the connector cover 72 and the display support 73.

Here, the coupling member 74 may be provided as a plastic synthetic resin. Further, the coupling member 74 may be externally coated with a conductive material. As necessary, the coupling member 74 may be provided as a conductor. For example, the coupling member 74 may include conductive metal such as stainless steel, aluminum, copper or the like.

The display support 73 includes a coupling member accommodating part 73a to accommodate the coupling member 74 therein, and a connection cable accommodating part 73b to accommodate the connection cable 65 (see FIG. 8).

The coupling member accommodating part 73a includes a plurality of reinforcing ribs 73c arranged vertically and horizontally, and the coupling member 74 may be coupled to the reinforcing rib 73c by a fastener (not shown).

The coupling member 74 is disposed in an upper part of the stand 71 and coupled to the stand 71 by a fastener (not shown). In addition to the fastener, the coupling member 74 may be coupled to the stand 71 by one of hooking, fitting, adhesion and the other coupling methods.

The coupling member 74 is provided leaving a cable passing space 74a so that the connection cable 65 (refer to FIG. 8) can pass through the stand 71.

Also, the coupling member 74 further includes a receiving part 74b where the bending portion 72b of the coupling member 74 is received. The receiving part 74b is shaped corresponding to the bending portion 72b.

Further, a conductive film 76 for electrically connecting a cable guide frame 77 (to be described later) and the connector cover 72 each other may be attached to the receiving part 74b of the coupling member 74. Alternatively, the conductive film 76 may be omitted if the coupling member 74 is in itself a conductor or if the coupling member 74 is conductive as it is externally coated with a conductive material.

The coupling member 74 and the connector cover 72 are coupled to each other by a fastener (not shown) fastened through the fastening holes 72d formed in the bending portion 72b and the fastening holes 74c formed on the opposite surface of the coupling member 74.

Figure 23:
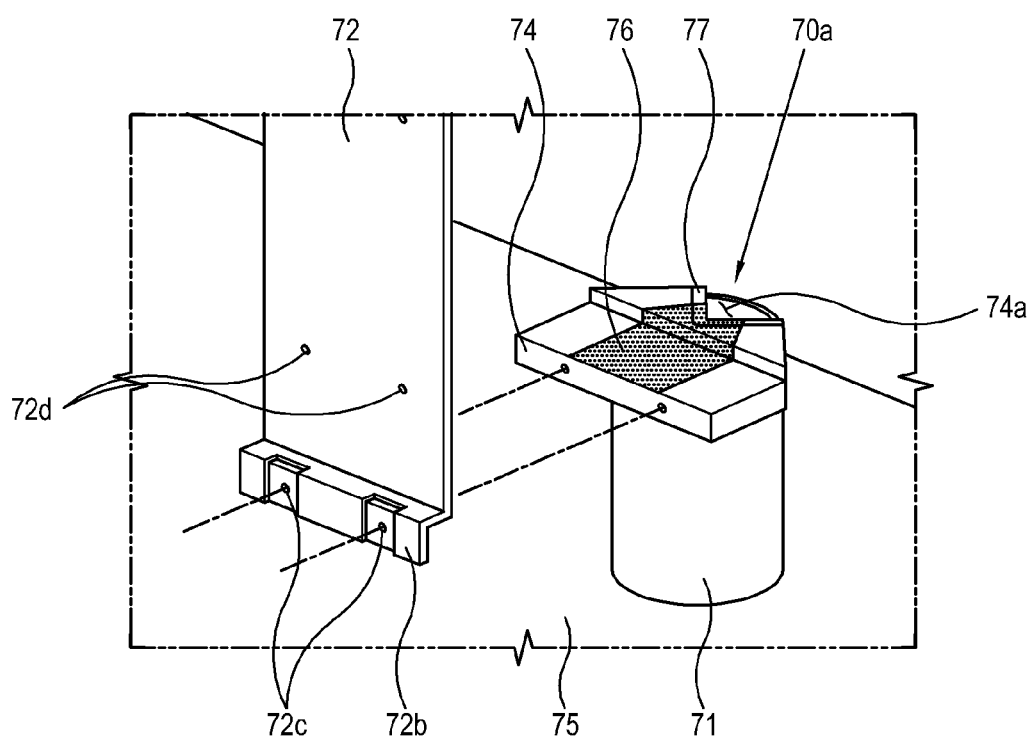
FIG. 23 is a partial perspective view of a stand unit of the display apparatus in FIG. 22.
Figure 24:
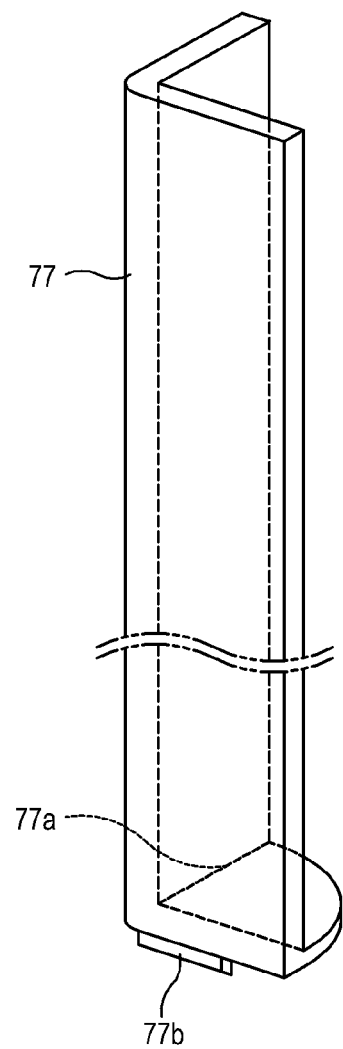
FIG. 24 is an enlarged schematic perspective view of a cable guide frame in the stand unit of FIG. 23.

As shown in FIGS. 23 and 24, the stand unit 70a may further include the cable guide frame 77 provided inside the stand 71 and securing the cable passing space for the connection cable 65 (see FIG. 8).

The cable guide frame 77 may be provided as a plastic resin externally coated with a conductive material. Alternatively, the cable guide frame 77 may be provided as a conductive metal. The cable guide frame 77 may be vary in shape and material as long as it is conductive.

Referring to FIG. 23, the cable guide frame 77 has an upper part in contact with the coupling member 74.

Figure 25:
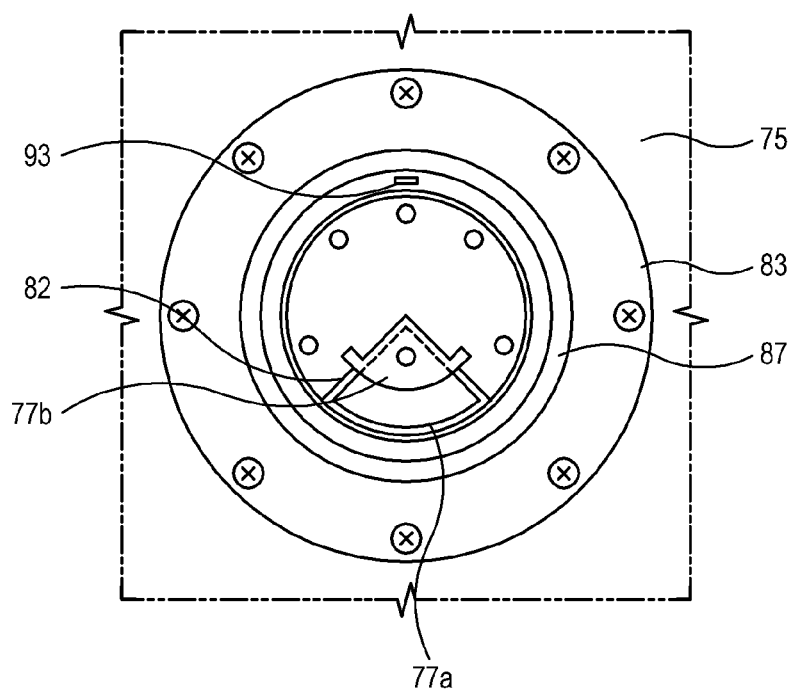
FIG. 25 is a rear plan view of the stand unit in FIG. 23.

FIG. 25 is a partial plan view showing the bottom of the stand unit 70a in the state that the swivel member 81 and the sliding member 87 are coupled to the top and bottom of the guide member 83, respectively. This has already been described with reference to the exploded perspective view of FIG. 9, and thus repetitive descriptions thereof will be avoided.

As shown in FIGS. 24 and 25, the cable guide frame 77 the cable guide frame 77 includes a lower protrusion 77b protruding through the cable opening 82 of the swivel member 81. The lower protrusion 77b is formed with a cable opening 77a communicating with the cable opening 82 so that the connection cable 65 can pass therethrough.

Figure 26:
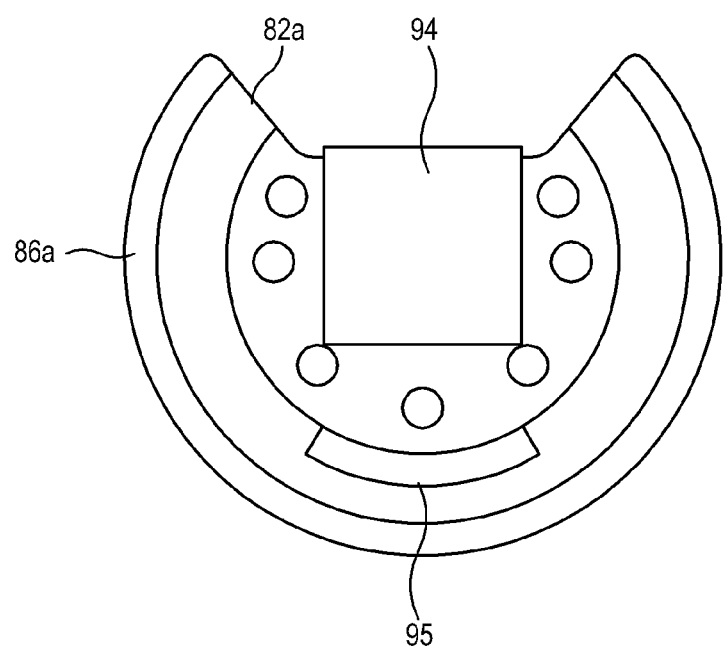
FIG. 26 is a rear plan view of a swivel bracket in the stand unit of FIG. 23.
Figure 27:
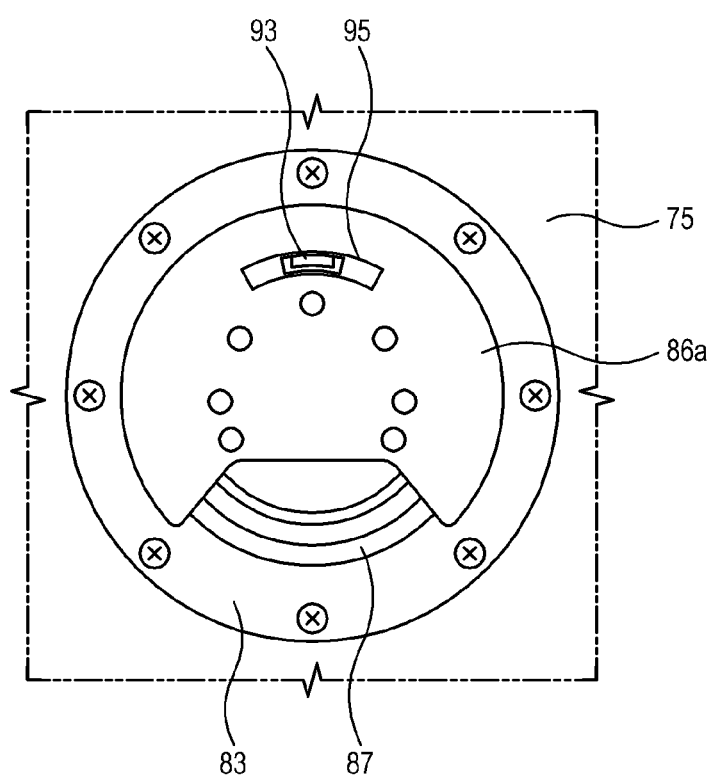
FIG. 27 is a rear plan view of the stand unit of FIG. 23 to which the swivel bracket of FIG. 26 is coupled.

FIG. 26 is a rear plan view of a swivel bracket 86a (to be described later), and FIG. 27 is a partial plan view showing that the swivel bracket 86a is coupled to the bottom of the stand unit 70a of FIG. 25.

Also, the stand unit 70a includes the swivel bracket 86a as shown in FIGS. 26 and 27. The swivel bracket 86a is different in shape from the swivel bracket 86 of the first exemplary embodiment but has the same function.

The swivel bracket 86 may be provided as a conductor. For example, the swivel bracket 86a may include aluminum, stainless steel, copper or the like conductive metal. As necessary, the swivel bracket 86a may be provided as a nonconductor such as a plastic resin and externally coated with conductive metal.

The swivel bracket 86a includes a projection accommodating portion 95 provided in the form of an arc-like groove such that a projection 93 provided in the guide member 83 can be accommodated therein and rotated by a predetermined angle; and an opening 82a opened at one side so that the connection cable 65 can pass through the cable opening 77a and the cable opening 82.

As shown in FIG. 26, a conductive pad 94 may be arranged inside the swivel bracket 86a so that the lower protrusion 77b of the cable guide frame 77 can be in close contact with the inside of the swivel bracket 86a.

The conductive pad 94 makes the cable guide frame 77 and the swivel bracket 86a be conductive each other. The conductive pad 94 may be a conductive adhesive film. Alternatively, the conductive pad 94 may vary in material and shape as long as it can make the cable guide frame 77 and the swivel bracket 86a be conductive.

Here, the guide member 83 may be also provided as a conductor. As described above, the guide member 83 may be provided as a nonconductor such as a plastic resin and externally coated with a conductive material.

Thus, the electric connection is achieved from the cable guide frame 77 to the main body casing 31 and the main body cover 32 of the main body 30 via the swivel bracket 86a, the guide member 83 being in contact with the swivel bracket 86a, and the main body support 75 coupled to the guide member 83.

If necessary, the sliding member 87 may be externally coated with a conductive material.

Also, the cable guide frame 77 and the connector cover 22 are electrically connected through the conductive film 76 as described above.

Below, the electric connection among the connector cover 22, the rear cover 26 and the rear chassis 13 will be described with reference to FIGS. 28 and 29.

The rear cover 26 may include metal. As necessary, the rear cover 26 may be provided as a plastic resin.

The rear cover 26 may further include the flange 26a extended outward along a plate direction in order to enlarge an area to contact the rear chassis 13. The flange 26a may be extended in opposite directions as shown in FIG. 12, or extended downward as shown in FIG. 28.

The rear surface (opposite to the rear chassis 13) of the rear cover 26 may be formed with a conductive coating layer 26b coated with a conductive material to enhance electric conductivity between the rear chassis 13 and the rear cover 26.

Figure 28:
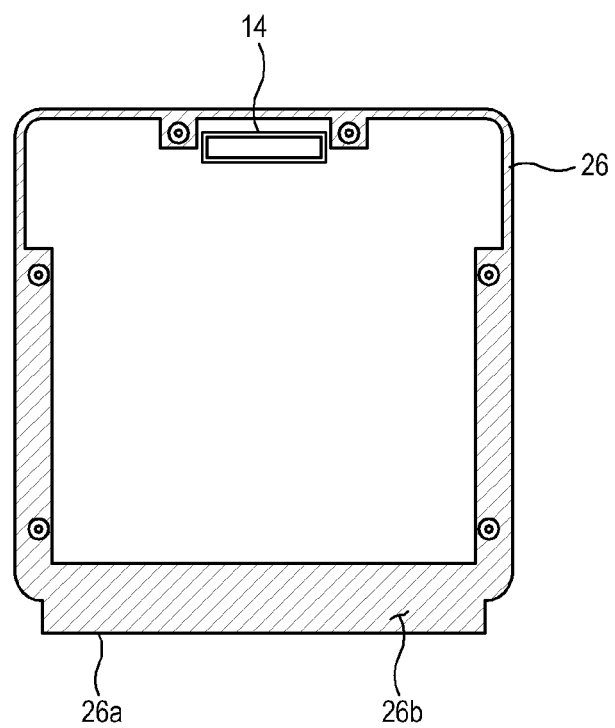
FIG. 28 is a rear plan view of a rear cover in the display apparatus of FIG. 22.

As shown in FIGS. 28 and 29, since the bending portion 72b of the connector cover 72 is in close contact with the flange 26a of the rear cover 26, the conductive coating layer 26b may be formed in a portion corresponding to the rear surface of the rear cover 26.

Meanwhile, the display connector 61 exposed through the rear cover 26 and the first connector 66 are coupled to each other, and the rear chassis 13 and the display support 73 are coupled by the fastener, thereby making the connector cover 72 and the rear cover 26 be in close contact with each other.

Thus, the connector cover 72 is electrically connected to the rear chassis 13 through the rear cover 26.

With the foregoing structure, the rear chassis 13 for grounding the display unit 10 can be electrically connected to the main body casing 31 and main body cover 32 for grounding the main body 30.

Specifically, the rear chassis 13->the rear cover 26->the connector cover 72->the conductive film 76->the cable guide frame 77->the conductive pad 94->the swivel bracket 86a->the guide member 83->the main body support 75->the main body cover 32->the main body casing 31 are all electrically connected.

Besides the foregoing method, there may be various methods for electrically connecting the rear chassis 13 for grounding the display unit 10 used as an upper electric device and the main body casing 31 for grounding the main body 30 used as a lower electric device via the stand unit 70.

Meanwhile, as the ground of the upper electric device and the ground of the lower electric device are electrically connected, it is possible to reduce electromagnetic interference (EMI).

Figure 31:
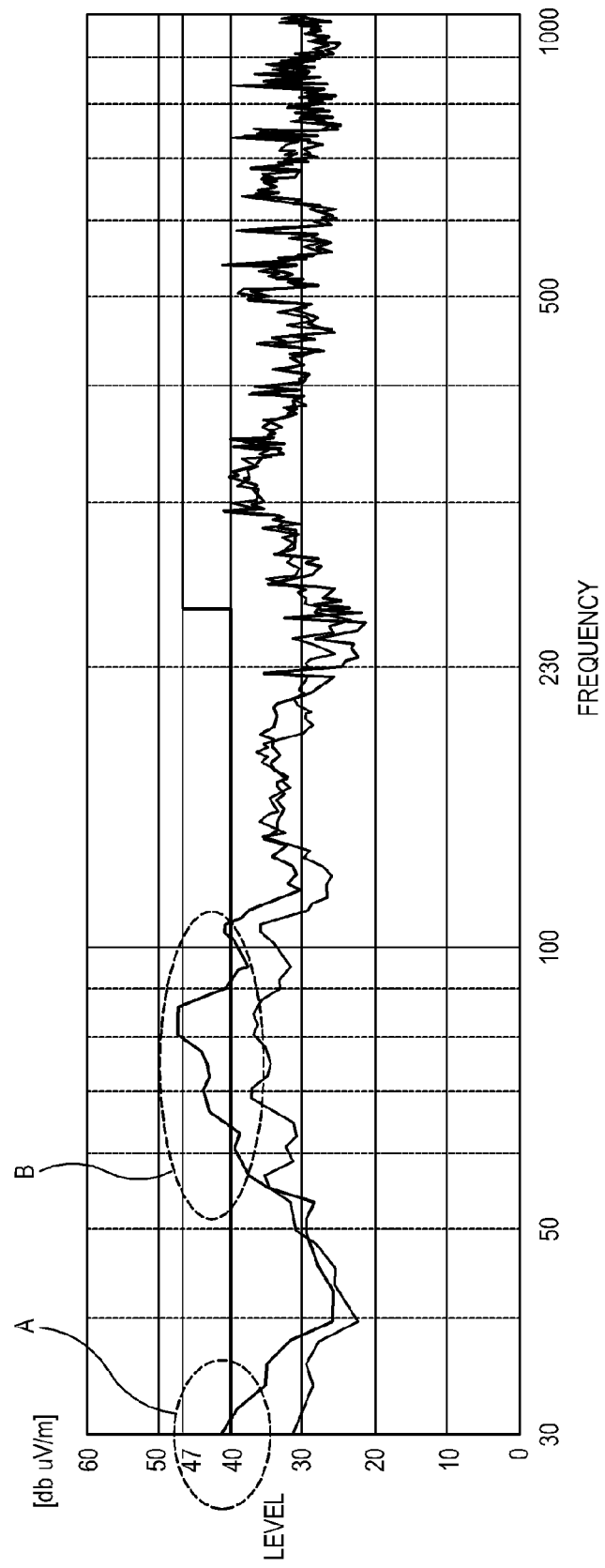
FIG. 31 is a graph showing a test result of EMI in a display apparatus using an insulating stand unit.

FIG. 31 is a graph showing a test result of EMI in a display apparatus in the case that the display unit 10 and the main body 30 are not electrically connected using an insulating stand unit.

The dotted and solid lines respectively show electromagnetic waves measured in the state that an antenna for measuring electromagnetic waves is disposed vertically and horizontally at a distance of 3m from the display apparatus.

In result, as shown in FIG. 31, an electromagnetic wave level A having a frequency of 30 MHz and an electromagnetic wave level B having a frequency of 60 MHz-100 MHz were measured as exceeding 40[dBµV/m].

Figure 30:
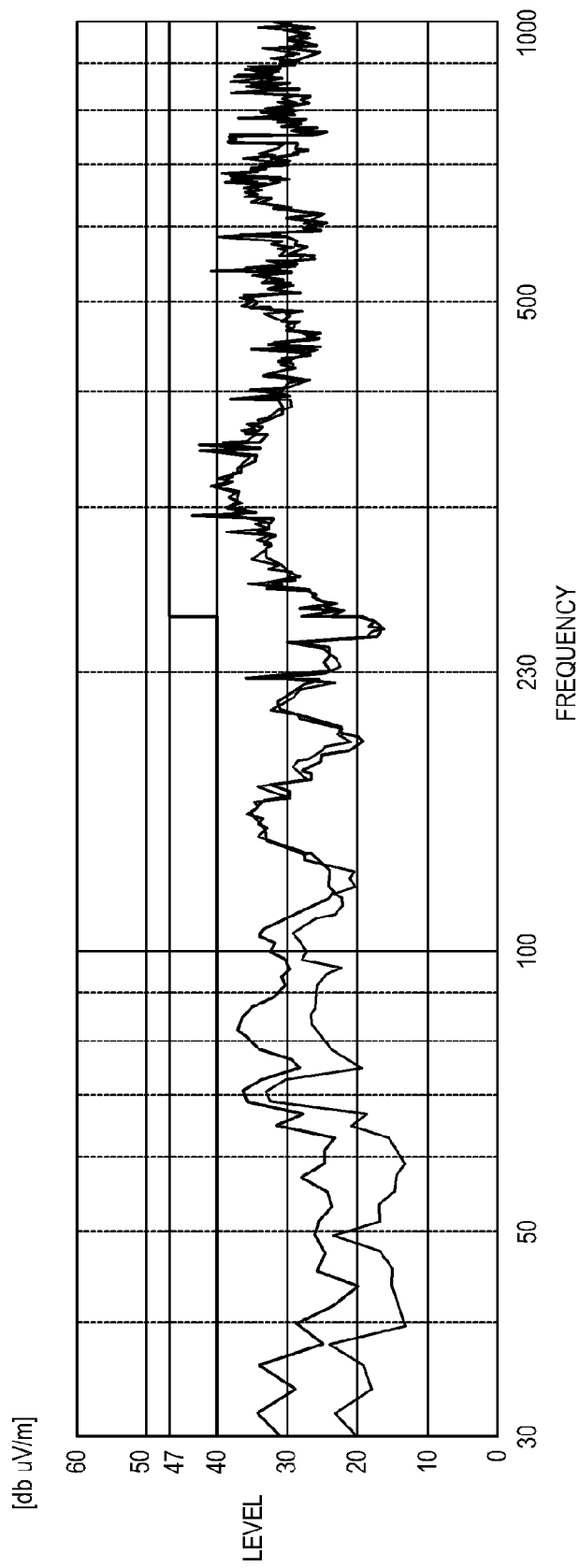
FIG. 30 is a graph showing a test result of electromagnetic interference (EMI) in the display apparatus of FIG. 22.

In the meantime, FIG. 30 is a graph showing a test result of the EMI_in the display apparatus according to the eighth exemplary embodiment.

Referring to FIG. 30, an electromagnetic wave level having a frequency of 30-230 MHz is equal to or less than 40[dBµV/m], and an electromagnetic wave level having a frequency of 230-1000 MHz is equal to or less than 47[dBµV/m]. Thus, it will be appreciated that the display apparatus 1a according to the eighth exemplary embodiment is improved in reducing the EMI.

According to a ninth exemplary embodiment, a display apparatus 1b includes a display unit with a rear chassis 13; a main body 30 accommodated in the rear of the rear chassis 13; and a wall-mount support member 140 coupled to the outside of the rear chassis 13.

The display unit includes a display panel (not shown) and a backlight unit (not shown) providing light to the display panel. The backlight unit (not shown) includes a light source (not shown); a light guide plate (not shown) to uniformly supply light emitted from the light source (not shown) to the display panel; and an optical film interposed between the light guide plate and the display panel.

The light source (not shown) may use a light emitting diode (LED) by way of example, and be provided as an edge type or a direct type. As described above, the LEDs of the edge type are accommodated along the edges of the display apparatus 1b, and the LEDs of the direct type are accommodated on the rear of the display panel. Alternatively, the LEDs may be provided as a tandem type where an LED array is disposed between plural separated light guide plates arranged in a row.

The wall-mount support member 140 may be made of stainless steel, aluminum, copper and alloy thereof. Besides, other metals may be used for the wall-mount support member.

The wall-mount support member 140 may be fitted to a stud (not shown) protruding from the outside of the rear chassis 13. Alternatively, one of the rear chassis 13 and the wall-mount support member 140 is provided with a hook (not shown) and the other one is provided with a projection to which the hook is hooked up, so that they can be coupled to each other. Further, the wall-mount support member 140 and the rear chassis 140 may be coupled by a coupling unit. Here, the stud (not shown), the hook (not shown) and the projection (not shown) for fastening the wall-mount support member 140 may be called a fastening member.

Alternatively, the stud (not shown) formed in the rear chassis 13 may be coupled with a wire mount (150, to be described later) as well as the wall-mount support member 140.

Figure 33A:
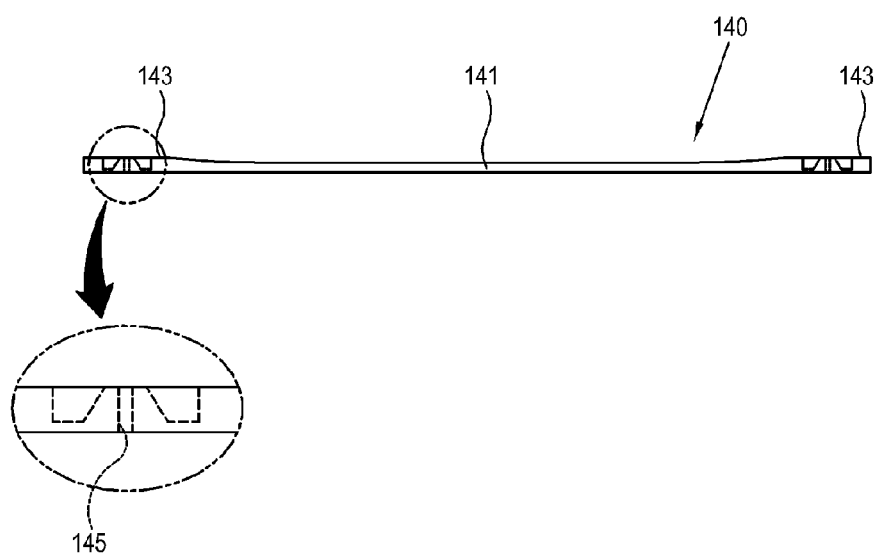
FIG. 33A is a side view of a wall-mount support member in the display apparatus of FIG. 32.
Figure 33B:
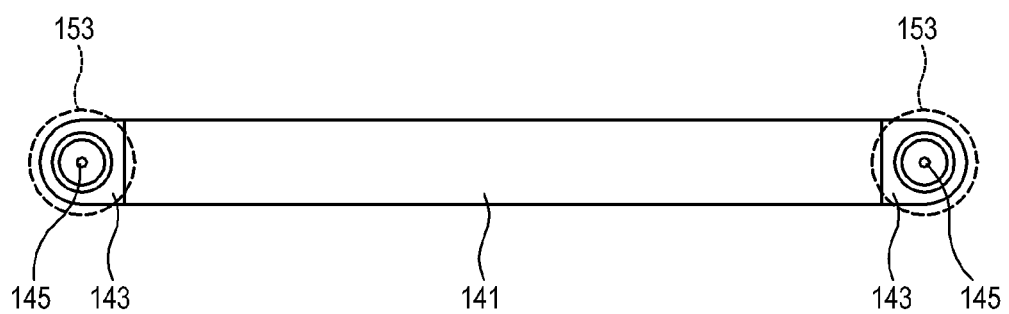
FIG. 33B is a plan view of the wall-mount support member in the display apparatus of FIG. 32.
Figure 34:
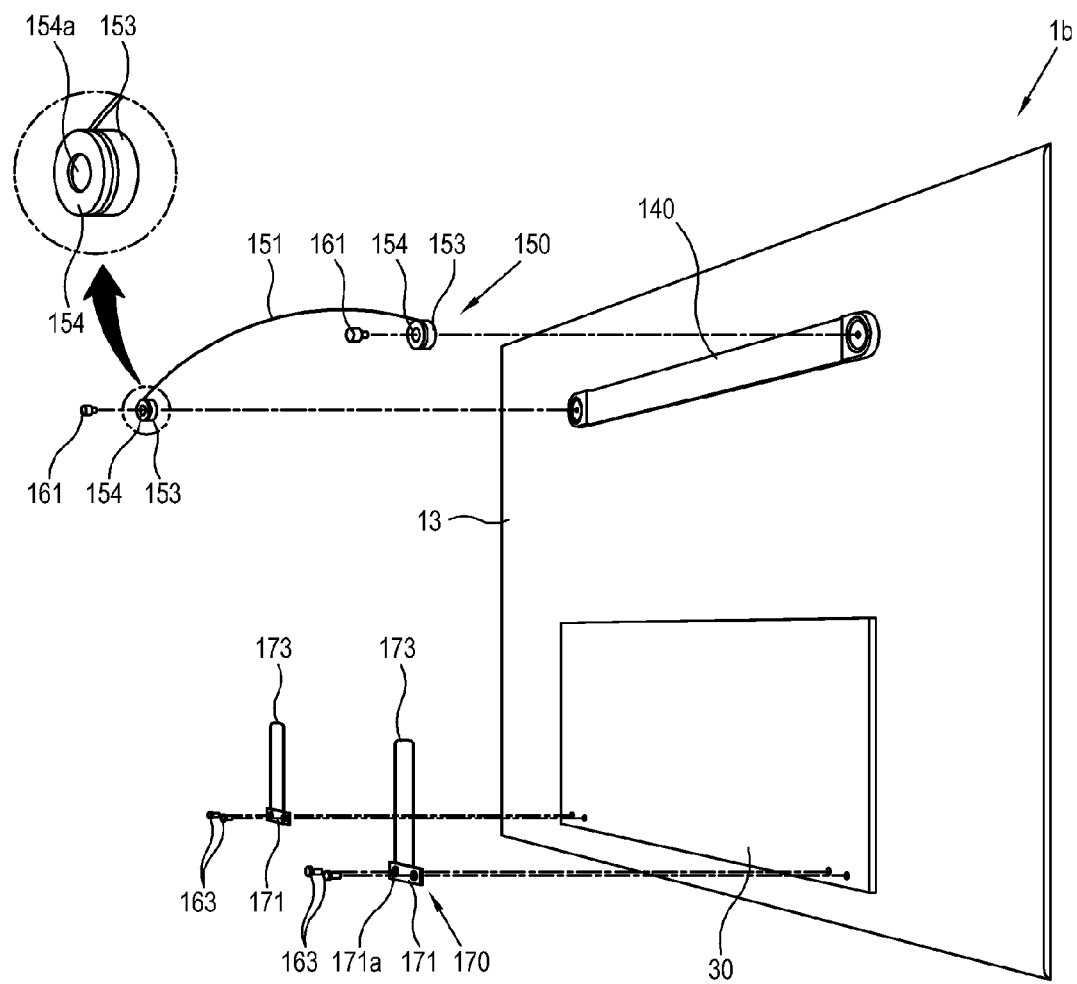
FIG. 34 is a schematic rear perspective view showing a procedure of installing a structure needed for mounting the display apparatus of FIG. 32 to a wall.

As shown in FIGS. 33A, 33B and 34, the wall-mount support member 140 includes a body part 141 extended lengthwise; and a mount coupling part 143 provided at each of opposite ends of the body part 141 and coupled with the wire mount 150.

Here, the wall-mount support member 140 may have various shapes depending on mounting types.

In the accompanying drawings, the mount coupling part 143 is coupled to the wire mount 150, but not limited thereto. Alternatively, various wall-mounts may be coupled to the mount coupling part 143.

Figure 32:
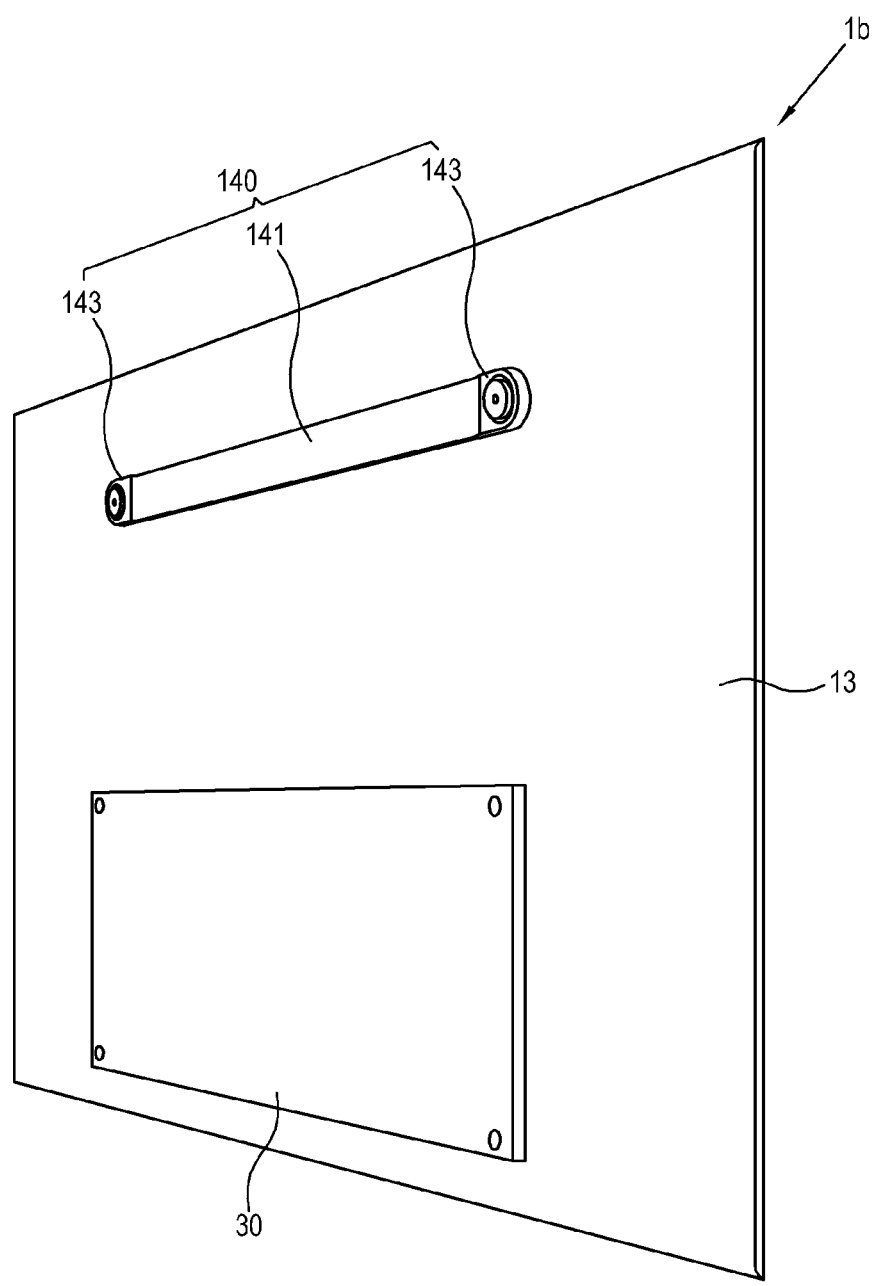
FIG. 32 is a schematic rear perspective view of a display apparatus according to a ninth exemplary embodiment.

FIG. 32 shows one wall-mount support member 140 at an upper portion, but not limited thereto. Alternatively, two wall-mount support members may be respectively provided at an upper portion and a lower portion, or at left and right sides.

Further, the wall-mount support member 140 may be disposed in a horizontal direction as shown in FIG. 32. Alternatively, the wall-mount support member may be disposed in a vertical direction or a diagonal direction.

Thus, the display apparatus 1B can be stably mounted to a wall.

Meanwhile, the mount coupling part 143 may be thicker than the body part 141.

The mount coupling part 143 is formed with a coupling hole 145 in which a fastening unit 161 (to be described later) is inserted. The mount coupling part 143 and the wire mount 150 are coupled with each other by the fastening unit 161. As necessary, the fastening unit 161 is coupled to the rear chassis 13 by passing through the mount coupling part 143 and the wire mount 150.

Here, a front chassis (not shown) and the rear chassis 13 may be thinly manufactured to thereby make the display apparatus 1b thin.

In the above exemplary embodiment, the main body 30 is accommodated in the rear of the rear chassis 13, but not limited thereto. As necessary, the main body 30 may not be disposed on the rear of the rear chassis 13. For example, the display unit and the main body 30 may be arranged as being spaced apart from each other, and a signal may be transmitted between them through wired or wireless communication.

FIG. 34 is a schematic rear perspective view showing that the wire mount 150 and the stand 170 are installed to the wall-mount support member 140 arranged on the rear chassis 12 of the display apparatus 1b.

The wire mount 150 includes a wire 151; a plurality of wire winding parts 154 provided at opposite ends of the wire 151 and winding the wire 151 thereon; and a plurality of wire accommodating parts 153 respectively accommodating the plurality or wire winding parts 154.

The each of the plurality of wire winding parts 154 is accommodated in the wire accommodating part 153 and rotatable in forward and backward directions. As each of the plurality of wire winding parts 154 rotates in the forward and backward directions, the length of the wire becomes longer or shorter between the plurality of wire winding parts 154.

The each of the plurality of wire winding parts 154 is formed with a hole 154a through which the fastening unit 161 passes, and the wire accommodating part 153 is also formed with a hole (not shown) through which the fastening unit 161 passes. Each of the plurality of wire winding parts 154 and the wire accommodating part 153 are coupled to the wall-mount support member 140 by the fastening unit 161.

To facilitate the coupling of the fastening unit 161, the coupling hole 145 of the wall-mount support member 140 may be internally threaded to engage with a thread of the fastening unit 161.

Also, the plurality of stands 170 may be coupled to the rear of the main body 30.

The stand 170 includes a lever 173, and a support bracket 171 rotatably supporting the lever 173. The support bracket 171 may be formed with a hole 171a in which a fastening unit 163 is inserted.

Figure 36:
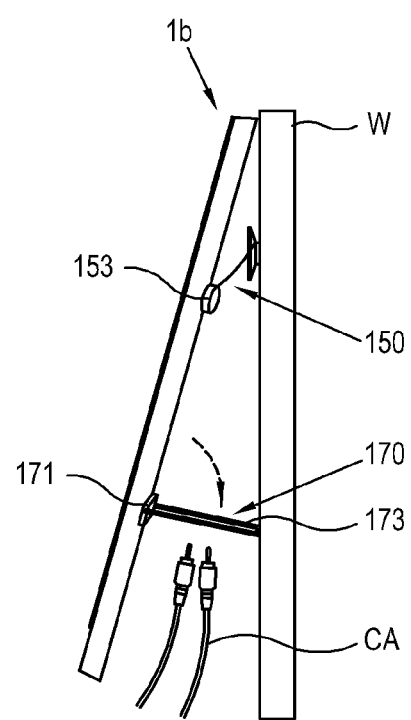
FIG. 36 is a schematic side view showing that the display apparatus of FIG. 34 is spaced apart from the wall while being mounted to the wall.

As shown in FIG. 36, the lever 173 serves to keep the display apparatus 1b spaced apart from the wall W.

FIG. 34 shows that the support bracket 171 is provided in the main body 30, but not limited thereto. Alternatively, the support bracket 171 may be coupled to the rear chassis 13. As necessary, the support bracket may be installed on the wall W since it functions to space the display apparatus 1b apart from the wall W.

Figure 35:
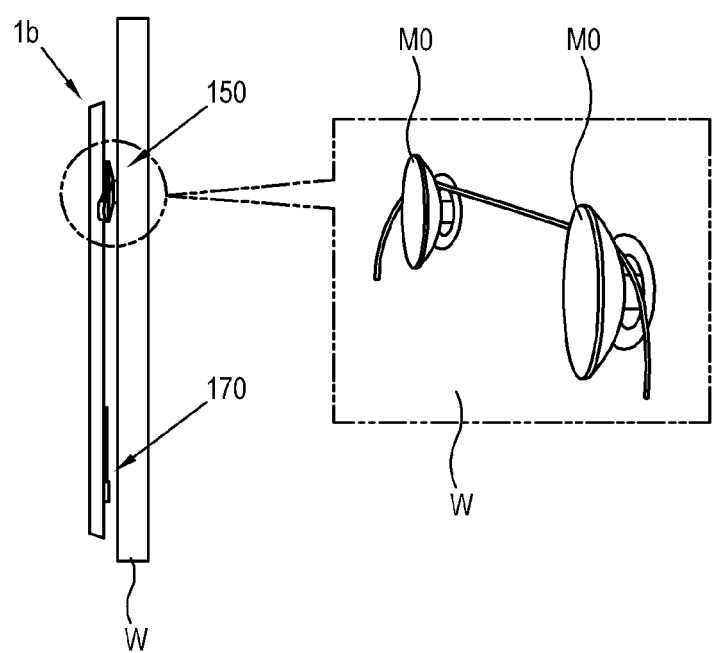
FIG. 35 is a schematic side view showing a state that the display apparatus of FIG. 34 is mounted to the wall.

FIG. 35 is a schematic side view showing a state that the display apparatus 1b coupling with the wire mount 150 is mounted to the wall W.

The wire 151 of the wire mount 150 is wound around a plurality of apparatus support projections MO installed on the wall W, so that the display apparatus 1b can be installed. Thus, the weight of the display apparatus 1b is transferred to the rear chassis 13 through the wall-mount support member 140.

At this time, if the display apparatus 1b, more specifically, the rear chassis 13 is thin, it is possible to decentralize the weight applied to the rear chassis 13 by providing the wall-mount support member 140 between the wire mount 150 and the rear chassis 13.

For example, the display unit of the display apparatus 1b may have a thickness of 50 mm or less. As necessary, the display unit may have a thickness of 10 mm or less. As described above, the thickness of the display unit corresponds to the thickness formed by both the front chassis (not shown) and the rear chassis 13.

Here, the thickness of the wall-mount support member 140 may be equal to or greater than that of the rear chassis 13.

Also, the wall-mount support member 140 and the rear chassis 13 may be provided as a single body. More specifically, a part of the rear chassis 13 may be as thick as the wall-mount support member 140 in a part corresponding to the wall-mount support member 140.

The wall-mount support member 140 may be made of plastics having high rigidity, and then coupled to the rear chassis 13 by insert-molding.

In the case that the display unit employs the LEDs arranged in an edge type, heat from the LEDs may be relatively concentrated on an edge part of the display apparatus 1b. Thus, the edge part is likely to be thermally deformed as compared with other parts.

Thus, the wall-mount support member 140 is placed adjacent to the edge of the display apparatus 1b, thereby preventing the thermal deformation of the rear chassis 13. In other words, the wall-mount support member 140 can reduce the thermal deformation due to temperature increase in the rear chassis 13.

FIG. 36 is a side view showing that the display apparatus 1b is spaced apart from the wall W while being mounted to the wall W, by the stand 170 installed behind the display apparatus 1b.

Since the display apparatus 1b can be kept spaced apart from the wall W, it is convenient for installing a cable to supply power or transmit a signal to the display unit or the main body 30.

Figure 37:
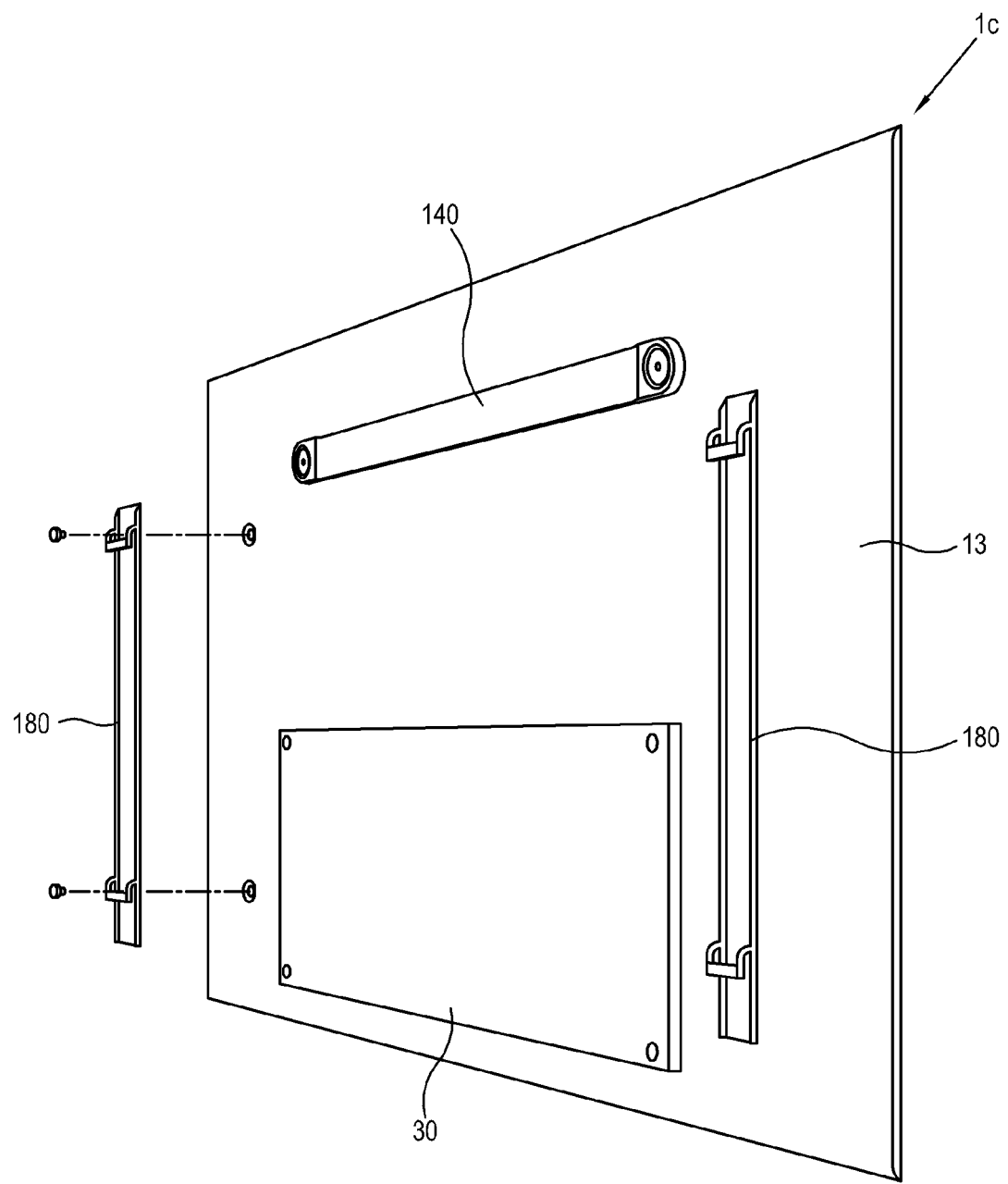
FIG. 37 is a schematic rear perspective view of the display apparatus according to a tenth exemplary embodiment.

As shown in FIG. 37, a display apparatus 1c according to a tenth exemplary embodiment includes an installation bracket 180 provided for installing the display apparatus 1c to a motorized supporter (not shown), and the wall-mount support member 140.

The installation bracket 180 is provided at each of left and right sides of the rear chassis 13. As shown in FIG. 37, there may be provided a pair of left and right installation brackets 180. Alternatively, a pair of installation brackets may be provided in up and down directions instead of the left and right directions.

The motorized supporter can be tilted left, right, up and down while supporting the display apparatus 1c, and move the display apparatus 1c in the up and down directions.

The wall-mount support member 140 may be installed to prevent the thermal deformation of the rear chassis 13 as described above. Also, the wall-mount support member 140 may be coupled to the rear chassis 13 so that the wire mount 150 can be easily installed in accordance with a user's preference.

In some cases, the wall-mount support member 140 may be interposed in the form of a flat plate between the installation bracket 180 and the rear chassis 13. Therefore, even though the rear chassis 13 is thin, the rear chassis 13 can be reinforced at a part to which weight is applied.

In the drawings, the wall-mount support member 140 is placed in an upper part of the display apparatus 1b, 1c, but not limited thereto. Alternatively, the wall-mount support member 140 may be placed in each of upper and lower parts or left and right parts.

As described above, the wall-mount support member 140 may be used for supporting the wire mount 150 and the installation bracket 180. Besides, the wall-mount support member 140 may be applied to various installation units for installing the display apparatus 1b, 1c to the wall W and interposed between the installation unit and the rear chassis 13. Thus, since the wall-mount support member 140 supports much of the weight of the display apparatus 1b, 1c even if the rear chassis 13 is thin, it is possible to make the display apparatus 1b, 1c thin.

Also, as described above, in the case of using the edge-type LED as the light source, the wall-mount support member 140 is arranged in the edge of the rear chassis 140, thereby preventing the thermal deformation while supporting the weight of the wall-mount display apparatus.

Figure 38:
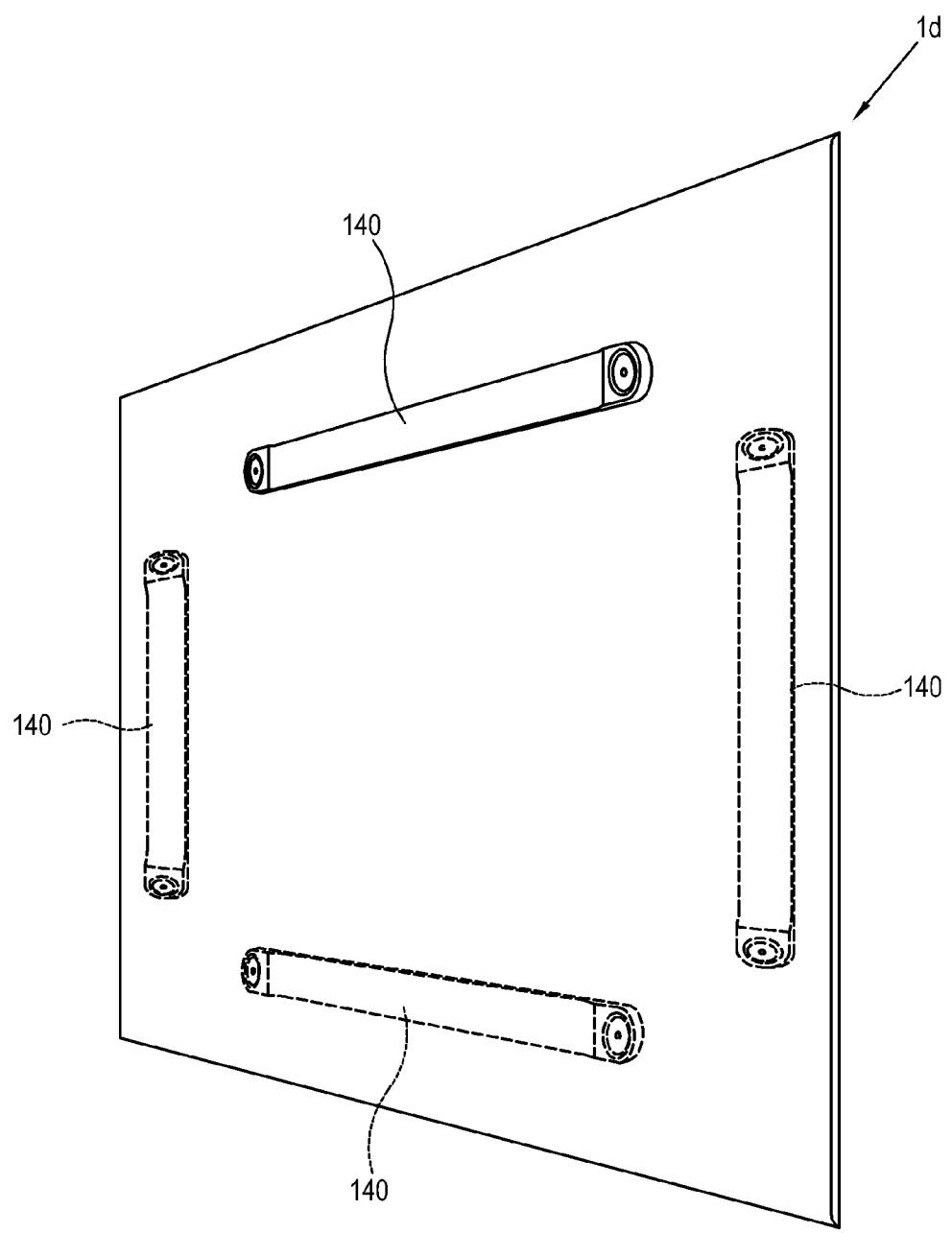
FIG. 38 is a schematic rear perspective view of the display apparatus according to an eleventh exemplary embodiment.

In a display apparatus 1d according to an eleventh exemplary embodiment, the main body is not coupled to the rear chassis 13 as shown in FIG. 38. That is, the display apparatus 1d shown in FIG. 38 includes only the display unit without the main body.

The main body and the display unit can wirelessly communicate with each other.

Referring to FIG. 38, at least one wall-mount support member 140 is arranged in the rear chassis 13 of the display unit. The wall-mount support member 140 may be placed at upper and lower sides so that the lengthwise direction thereof can be parallel with the left and right directions.

Alternatively, the wall-mount support member 140 may be provided at left and right sides so that the lengthwise direction thereof can be parallel with the up and down directions.

Also, in some cases, the wall-mount support member may be placed at a predetermined position among the up, down, left and right sides. Further, there may be provided three or more wall-mount support members.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
    a display unit comprising a display connector exposed backward from a back side of the display unit, the display unit configured to display an image;
    a main body comprising
        a power supply unit which supplies power to the display unit,
        an image processing unit which outputs image signals
        a main body connector which is directly or indirectly connected to the display connector to supply the power and the image signals output from the power supply unit and the image processing unit, respectively, to the display unit,
    a main body casing which accommodates the power supply unit and the main body connector, and
        a main body cover including a main body connector opening, through which the main body connector is exposed to an outside of the main body cover;
    a stand unit comprising a lower side configured to be coupled to the main body, the stand unit being erect, and an upper side configured to be coupled to the display unit, and
    a connection cable including a first connector and a second connector at both end ns, which can be coupled to the display connector and the main body connector, respectively, said connection cable being mounted in the inner side of said stand unit,
    wherein the main body connector is connected to the display connector by the stand unit
    wherein the display unit and the main body are separate from each other,
    wherein the main body cover is mounted on top of the main body casing. the stand and unit including a display support coupleable to the display unit, a main body support coupleable to the main body, and a stand coupled to the display support and the body support;
    wherein the first connector of the connection cable is mounted on the display support such that the first connector is joined to the display connector when fastening the display support to the back side of the display unit; and
    wherein the second connector of the connection cable is mounted on the main body support such that the second connector is joined to the main body connector when fastening the main body support to the main body cover.

2. The display apparatus according to claim 1, wherein at least one of the display connector and the main body connector comprises:
    image signal pins for the image signals; and
    first power pins and second power pins which are respectively disposed in both sides of the image signal pins disposed between the first and the second power pins to supply the power to the display unit.

3. The display apparatus according to claim 2, wherein the display unit comprises a backlight unit comprising a first light source disposed at one side of the display unit and a second light source disposed at another side of the display unit to provide light to the display panel, and
    wherein the power is supplied to the first and the second light sources via the first and the second power pins, respectively.

4. The display apparatus according to claim 1, wherein the display connector is one single connector and the main body connector is another single connector.

5. The display apparatus according to claim 1, wherein the display unit further comprises a display panel configured to display the image, and a panel driving board which comprises a timing controller which controls a time difference which occurs when the image signals input from the image processing unit are displayed on the display panel, and
    wherein the display connector is mounted on the panel driving board.

6. The display apparatus according to claim 5, further comprising a rear cover which covers the panel driving board.

7. The display apparatus according to claim 6, wherein the display unit further includes a front chassis and a rear chassis which are disposed at a front side and a rear side of the display unit, respectively, with the display panel disposed between the front chassis and the rear chassis, and
    wherein the panel driving board and the rear cover are fastened to a back side of the rear chassis.

8. The display apparatus according to claim 7, wherein the rear cover covers an entire back side of the rear chassis.

9. The display apparatus according to claim 1, wherein the display unit further comprises:
    a display panel which is disposed between a front chassis and a rear chassis of the display unit and configured to display the image;
    a panel driving board which is mounted on a back side of the rear chassis and is mounted thereon with a timing controller which controls a time difference which occurs when the image signals input from the image processing unit are displayed on the display panel, and the display connector; and
    a connector board which is mounted on the back side of the rear chassis in such a manner so that the connector board is separated from the panel driving board, and supports the display connector.

10. The display apparatus according to claim 9, further comprising a rear cover which is coupled to the back side of the rear chassis and covers the panel driving board and the connector board.

11. The display apparatus according to claim 1, wherein the main body further comprises at least one speaker which is disposed in at least one of a front side and lateral sides of the main body.

12. The display apparatus according to claim 1, further comprising a swivel unit which allows the stand unit to be rotated with respect to the main body around a longitudinal axial line of the stand unit.

13. The display apparatus according to claim 12, wherein the swivel unit comprises a swivel member which is coupled to the stand unit and is rotated along with the stand unit, a guide member which is disposed in the main body and guides a rotation of the swivel member, a swivel bracket which is coupled to the swivel member, with the guide member being disposed between the swivel bracket and the swivel member, and is rotated along with the swivel member, and a sliding member which is disposed between the guide member and the swivel bracket.

14. The display apparatus according to claim 1, wherein a bottom of the main body is disposed equal to or lower than a bottom of the display unit.

15. The display apparatus according to claim 1, wherein the display unit further comprises:
   a display panel which is disposed between a front chassis and a rear chassis of the display unit and configured to display the image;
   a panel driving board which is mounted on a back side of the rear chassis and is mounted thereon with a timing controller which controls a time difference which occurs when the image signals input from the image processing unit are displayed on the display panel, and the display connector;
   a rear cover which covers the panel driving board; and
   a rear cover accommodating unit which is disposed in the main body and accommodates the rear cover.

16. The display apparatus according to claim 1, wherein the display unit further comprises a user input unit, and
   wherein a control signal input through the user input unit is delivered to the main body via the display connector and the main body connector.

17. The display apparatus according to claim 1, wherein the main body further comprises a power board which is disposed in the main body casing and is disposed thereon with the power supply unit, and a main board which is disposed in the main body casing and is disposed thereon with the image processing unit.

18. The display apparatus according to claim 17, wherein the main body further comprises at least one of a tuner and an external signal input unit.

19. The display apparatus according to claim 1, wherein the main body further comprises a user input unit disposed at a top of the main body.

20. The display apparatus according to claim 19, wherein the user input unit is disposed to be slidably moved forward from and backward into the main body.

21. The display apparatus according to claim 1, further comprising:
   the stand unit electrically connecting ground of the main body with ground of the display unit.

22. The display apparatus according to claim 1,
   wherein the first connector is mounted to the upper end of the stand unit and the second connector is mounted to the lower end of the stand unit, for coupling to the display connector and the main body connector respectively.

* * * * *